United States Patent
Burd et al.

(10) Patent No.: US 6,792,607 B1
(45) Date of Patent: Sep. 14, 2004

(54) DATABINDING USING SERVER-SIDE CONTROL OBJECTS

(75) Inventors: Gary S. Burd, Kirkland, WA (US); Kenneth B. Cooper, Seattle, WA (US); Scott D. Guthrie, Redmond, WA (US); David S. Ebbo, Redmond, WA (US); Mark T. Anders, Bellevue, WA (US); Ted A. Peters, Seattle, WA (US); Stephen J. Millet, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/573,656

(22) Filed: May 18, 2000

(51) Int. Cl.⁷ .................................................. G06F 9/54
(52) U.S. Cl. ........................ 719/316; 719/318; 719/311; 707/102
(58) Field of Search ................................. 719/310–320; 709/200–203; 707/1–10, 100–104.1

(56) References Cited

U.S. PATENT DOCUMENTS

| | | | |
|---|---|---|---|
| 5,748,890 A | | 5/1998 | Goldberg et al. |
| 5,774,670 A | * | 6/1998 | Montulli ..................... 709/227 |
| 5,812,996 A | | 9/1998 | Rubin et al. |
| 5,835,724 A | * | 11/1998 | Smith ......................... 709/227 |
| 5,897,622 A | | 4/1999 | Blinn et al. |
| 5,940,075 A | | 8/1999 | Mutschler, III et al. ..... 343/335 |
| 5,953,524 A | | 9/1999 | Meng et al. |
| 5,961,601 A | * | 10/1999 | Iyengar ........................ 709/229 |
| 5,983,227 A | | 11/1999 | Nazem et al. |
| 5,991,802 A | * | 11/1999 | Allard et al. ................ 709/219 |
| 6,014,666 A | | 1/2000 | Helland |
| 6,032,207 A | | 2/2000 | Wilson |
| 6,076,108 A | | 6/2000 | Courts et al. |
| 6,108,717 A | | 8/2000 | Kimura et al. |
| 6,115,744 A | * | 9/2000 | Robins et al. ............... 709/227 |
| 6,178,461 B1 | | 1/2001 | Chan et al. |
| 6,185,608 B1 | | 2/2001 | Hon et al. |
| 6,205,480 B1 | | 3/2001 | Broadhurst et al. |
| 6,212,192 B1 | | 4/2001 | Mirashrafi et al. |
| 6,230,160 B1 | | 5/2001 | Chan et al. |
| 6,247,044 B1 | | 6/2001 | Gosling et al. |
| 6,253,228 B1 | | 6/2001 | Ferris et al. |
| 6,351,767 B1 | | 2/2002 | Batchelder et al. |
| 6,370,561 B1 | | 4/2002 | Allard et al. |
| 6,373,841 B1 | | 4/2002 | Goh et al. |
| 6,397,253 B1 | | 5/2002 | Quinlin et al. |

(List continued on next page.)

FOREIGN PATENT DOCUMENTS

| | | | |
|---|---|---|---|
| WO | WO 98/21651 | 5/1998 | |
| WO | WO 98/44695 | * 10/1998 | ........... H04L/29/06 |
| WO | WO 99/34288 | 7/1999 | |

OTHER PUBLICATIONS

European Search Report for EP 01 11 1678.
European Search Report for EP 01 11 1681.
European Search Report for EP 01 11 1680.

(List continued on next page.)

Primary Examiner—St. John Courtenay, III

(57) ABSTRACT

Server-side control objects corresponding to client-side user interface elements are created in a control object hierarchy. Properties of the control objects may be data bound to properties of a server-side data source (e.g., a server-side database). Hierarchical data binding relationships are established between properties of control objects and properties of a data source. Template declarations are used to define the configuration of binding container objects that correspond to data objects in the data source. An iterating control object determines the number of data objects in the data source increase according number of binding container objects. A simple data binding types include without limitation: (1) unidirectional data binding from the data source to a control object; (2) unidirectional data binding from a control object to the data source; and (3) bidirectional data binding between a control object and the data source.

20 Claims, 11 Drawing Sheets

U.S. PATENT DOCUMENTS

| | | | |
|---|---|---|---|
| 6,405,241 B2 | | 6/2002 | Gosling et al. |
| 6,460,071 B1 | * | 10/2002 | Hoffman ..................... 709/203 |
| 6,460,141 B1 | | 10/2002 | Olden |
| 6,480,894 B1 | | 11/2002 | Courts et al. |
| 6,487,665 B1 | | 11/2002 | Andrews et al. |
| 6,557,038 B1 | | 4/2003 | Becker et al. |
| 6,622,168 B1 | | 9/2003 | Datta |
| 2001/0054020 A1 | | 12/2001 | Barth et al. |
| 2002/0008703 A1 | | 1/2002 | Merrill et al. |
| 2003/0009519 A1 | | 1/2003 | Gosling et al. |
| 2003/0009567 A1 | | 1/2003 | Farouk |
| 2003/0018827 A1 | | 1/2003 | Gutherie et al. |
| 2003/0025728 A1 | | 2/2003 | Ebbo et al. |
| 2003/0028565 A1 | | 2/2003 | Landsman et al. |
| 2003/0074634 A1 | * | 4/2003 | Emmelmann ............... 715/513 |

OTHER PUBLICATIONS

European Search Report for EP 01 11 1682.

Esposito, D., "Heaven Sent," Developer Network Journal, Mar.–Apr. 2001, Matt Publishing, UK, No. 23, pp. 18–24.

Chapter 3, "Mechanics of Developing JavaScript Applications," Server–Side Javascript Guide, 'Online! 1999, pp. 51–108, www. Developer.netscape.com/docs/manuals, ssjs/1_4/ssjs.pdf>.

Chapter 6, "Session Management Service," Server–Side Javascript Guide, 'Online! 1999, pp. 125–166, www.developer.netscape.com/docs/manuals/ssjs/1_4/ssjs.pdf>.

Article, ColdFusion Web Application Server, update and summary, from Allaire Corp—www@allaire.com.

"A Brief History of Hypertext", from Microsoft Corporation © 1996.

"HTTP Made Really Easy—A Practical Guide to Writing Clients and Servers", by Marshall, Aug. 15, 1997.

"HTML Encyclopedia—The form tag—The HTML element".

"Developing ASP–Based Applications" from Microsoft Corporation © 1996.

European Search Report for EP 01 11 1679.

Franklin, K., "Supercharge Data Binding," Visual Basic Programmer's Journal, Mar. 2000, Fawcette Technical Publications, vol. 10, No. 3, pp. 32–33, 39–40, 42, 44, 46.

Dobson, Rick, "Data Binding in Dynamic HTML," DBMS MAG, 'Online! Mar. 1998 (1998–03), pp. 47–52.

Shapiro, M., "A Binding Protocol for Distributed Shared Objects," Proceedings of the International Conference on Distributed Computing Systems, Poznan, Poland, Jun. 21–24, 1994, Los Alamitos, IEEE Comp. Soc. Press.

Wu, Dapeng; Hou, Yiwci Thomas; Zhang, Ya–Qin; "Scalable Video Transport over Wireless IP Networks"; IEEE 2000; pp. 1185–1191.

Anderson, Richard; Homer, Alex; Howard, Rob; Sussman, Dave; "A Preview of Active Server Pages+"; Copyright 2000, Wrox Press, pp. 1–73.

Penn, Gerald; Hu, Jianying; Luo, Hengbin; McDonald, Ryan; "Flexible Web Document Analysis for Delivery to Narrow–Bandwidth Devices"; IEEE 2001; pp. 1074–1078.

"A Brief History of Hypertext" Microsoft Corporation, 1996, 1 page.

Hovanes, Michael E.; Deal, John R. Grizz; Rowberg, Alan H.; "Seamless Multiresolution Display of Portable Wavelet-Compressed Images" Journal of Digital Imaging, vol 12, no 2, suppl 1 (May), 1999, pp 109–111.

Ingham; David B; "W3Objects: A Distributed Object–Oriented Web Server" Object–Oriented Web Servers and data Modeling Workshop, Sixth International World Wide Web Conference, Apr. 7, 1997, Santa Clara, CA 4 pages.

Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol 467 (2002) pp. 28–33.

"OOP Launches Hammock at JavaOne" http://www.oop.com/pr2000_06_08.jsp?gui=Plain Jun. 8, 2000, 1 page.

"Hammock: Think of it as Swing for the Web"; Jul. 14, 2000; 10 pages.

Hammond, Eric "Hammock Swings through Web interfaces" www.infoworld.com/articles/mt/xml/00/07/17/000717mthammock.xml; Jul. 14, 2000; 3 pages.

Duan, Nick N.; "Distributed Database Access in a Corporate Environment Using Java" Bell Atlantic Corporation; 1996; 8 pages.

Nadamoto, Akiyo; Kondo, Hiroyuki; Tanaka, Katsumi; "WebCarousel: Restructuring Web Search Results for Passive Viewing in Mobile Environments" IEEE 2001 p. 164–165.

Developing ASP–Based Applications: Microsoft 1996, 5 pages.

"ColdFusion: Web Application Server"; Allair Corp; www.allair.com; 1995–1999.

"Alterego Networks Introduces First Mobile Web Server for Enterprises, Telcos and Providers"; Redwood City, CA; Nov. 14, 2000; 3 pages.

"Bluestone Software Layes Foundation for Internet Operating Environment with Total–E Server . . . " Screaming Media, Business Wire; Jun. 5, 2000; 3 pages.

Stewart, Tony; "The Document as Application: Issues and Implications" GCA XML Europe 1999; pp. 575–599.

Marshall, James; "HTTP Made Really Easy: A Practical Guide to Writing Clients and Servers"; Aug. 15, 1997; 14 pages.

"HTML Encyclopedia"; http://www.scit.wlv.ac.uk/encyc/form.html; 2 pages.

"Best Practices for Creating Adaptive User Interfaces with the Mobile Internet Toolkit"; Microsoft Corporation, Jan. 2002; 15 pages.

"Best Practices for the Microsoft Mobile Internet Toolkit Image Control"; Microsoft Corporation, Feb. 2002.

Holmes, John W.; e–Mail response to question regarding GET/POST.HTTP request, extracted from Google's News groups, php.general, Nov. 11, 2002.

Solomon, David A. "Inside Windows NT, Second Edition"; Microsoft Press 1998; pp. 310–319.

Custer, Helen; "Inside Windows NT"; Microsoft Press 1993; pp. 74–81.

Frost, Jim; "Windows NT Security"; May 4, 1995; 7 pages; http://world.std.com/~jimf/papers/nt–security/nt–security.html.

Davulcu, Hasan; Freire, Juliana; Kifer, Michael; Ramakrishnan, I.V.; "A Layered Architecture for Querying Dynamic Web Content"; ACM 1999; pp. 491–502.

Kitayama, Fumihiko; Hirose, Shin–Ichi; Kondoh, Goh; Kuse, Kazushi; "Design of a Framework for Dynamic Content Adaptation to Web–Enabled Terminals and Enterprise Applications"; IEEE 1999, pp. 72–79.

Ingham, David B.; W3Objects: A Distributed Object–Oriented Web Server; Object–oriented Web Servers and Data Modeling Workshop, Sixth International World Wide Web Conference; Apr. 7, 1997; 4 pages; Santa Clara, USA.

* cited by examiner

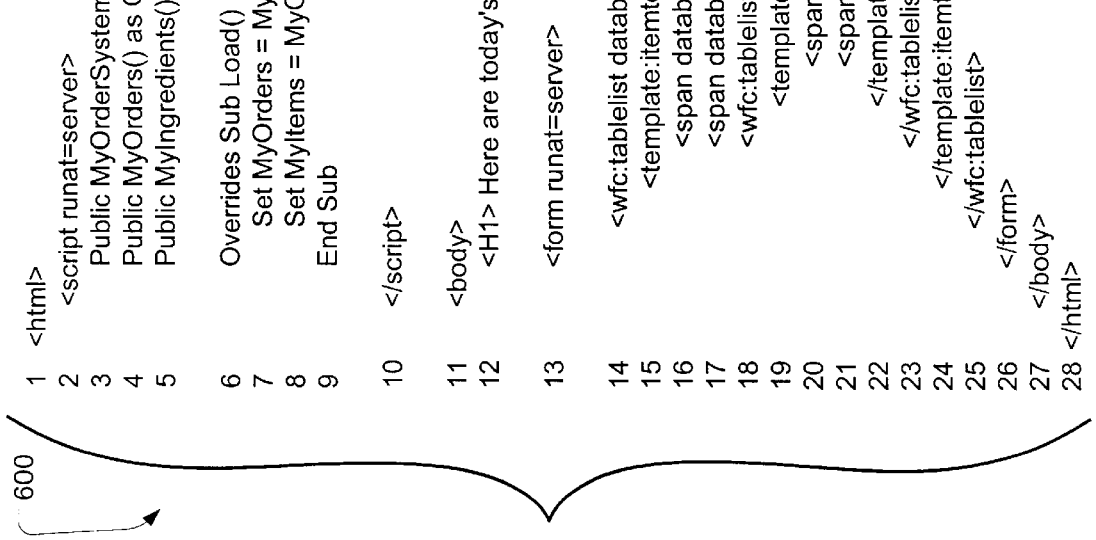

```
1  <html>
2    <script runat=server>
3      Public MyOrderSystem as New OrderSystem
4      Public MyOrders() as Order
5      Public MyIngredients() as Ingredients 6      Overrides Sub Load()
7        Set MyOrders = MyOrderSystem.GetOrdersFromDay(Now)
8        Set MyItems = MyOrderSystem.GetItemsFromOrders(MyOrders.DataItem.OrderID)
9      End Sub 10   </script>

11   <body>
12     <H1> Here are today's orders: </H1>
13     <form runat=server>

14       <wfc:tablelist databinding="datasource:Page.MyOrders" runat=server>
15         <template:itemtemplate>
16           <span databinding="Text:DataItem.OrderID" runat=server/>
17           <span databinding="Text:DataItem.Quantity" runat=server/>
18           <wfc:tablelist databinding="datasource:MyOrders.MyIngredients" runat=server>
19             <template:itemtemplate>
20               <span databinding="Text:Index" runat=server/>
21               <span databinding="Text:DataItem.Item" runat=server/>
22             </template:itemtemplate>
23           </wfc:tablelist>
24         </template:itemtemplate>
25       </wfc:tablelist>
26     </form>
27   </body>
28 </html>
```

```
1   <html>
2     <script runat=server>
3       Public MyOrderSystem as New OrderSystem
4       Public MyOrders() as Order
5       Public MyIngredients() as Ingredients 6       Overrides Sub Save()
7         MyOrderSystem.UpdateOrders(MyOrders)
8         MyOrderSystem.UpdateItems(MyItems)
9       End Sub 10    </script>

11    <body>
12    <H1> Here are today's orders: </H1>
13    <form runat=server>
14      <wfc:tablelist databinding="datasource:Page.MyOrders" runat=server>
15        <template:itemtemplate>
16          <span databinding="Text:DataItem.OrderID" runat=server/>
17          <span databinding="Text:DataItem.Quantity" runat=server/>
18          <wfc:tablelist databinding="datasource:MyOrders.MyIngredients" runat=server>
19            <template:itemtemplate>
20              <span databinding="Text:Index" runat=server/>
21              <span databinding="Text:DataItem.Item" runat=server/>
22            </template:itemtemplate>
23          </wfc:tablelist>
24        </template:itemtemplate>
25      </wfc:tablelist>
26    </form>
27    </body>
28  </html>
```

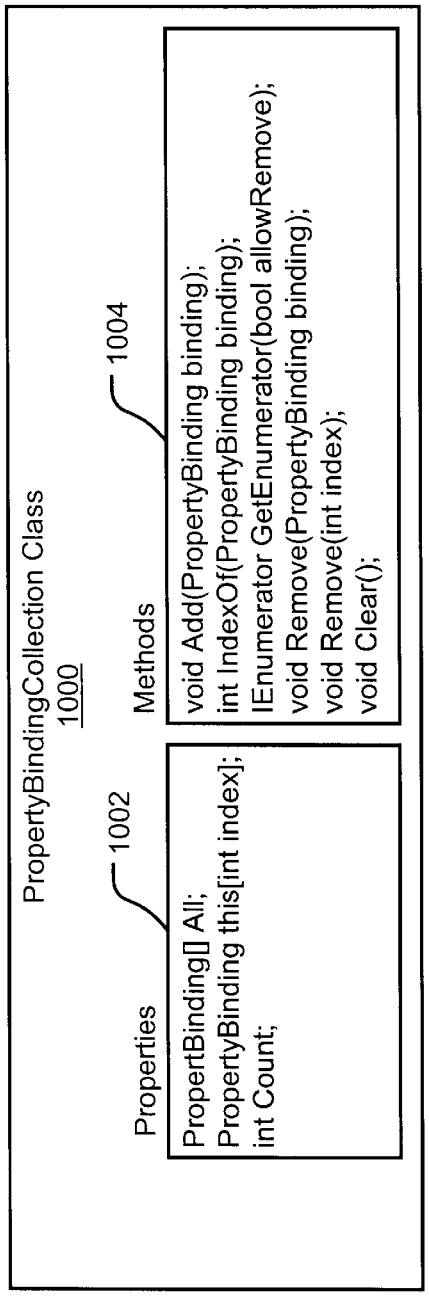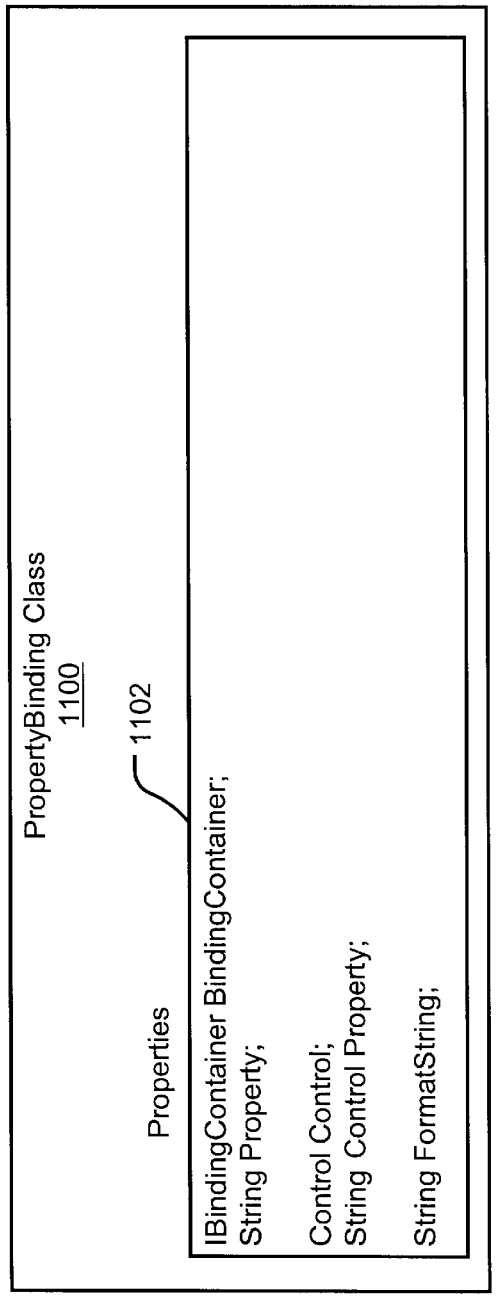
FIG. 10
FIG. 11

DATABINDING USING SERVER-SIDE CONTROL OBJECTS

CROSS-REFERENCE TO RELATED APPLICATIONS

The present application is related to U.S. patent application Ser. No. 09/574,144, entitled STATE MANAGEMENT OF SERVER-SIDE CONTROL OBJECTS; U.S. patent application Ser. No. 09/573,769, entitled SERVER-SIDE CONTROL OBJECTS FOR PROCESSING CLIENT-SIDE USER INTERFACE ELEMENTS; U.S. patent application Ser. No. 09/573,768, entitled SERVER-SIDE CODE GENERATION FROM A DYNAMIC WEB PAGE CONTENT FILE; and U.S. patent application Ser. No. 09/574,165, entitled POSTBACK INPUT HANDLING BY SERVER-SIDE CONTROL OBJECTS, filed concurrently herewith and assigned to the Assignee of the present invention.

TECHNICAL FIELD

The invention relates generally to a web server framework, and more particularly to server-side control objects that bidirectionally bind with properties of server-side data tables.

BACKGROUND OF THE INVENTION

A typical web browser receives data from a web server that defines the appearance and rudimentary behavior of a web page for display on a client system. In a typical scenario, a user specifies a Uniform Resource Locator ("URL"), a global address of a resource on the World Wide Web, to access a desired web site. Generally, the term "resource" refers to data or routines that can be accessed by a program. An example URL is "http://www.microsoft.com/ms.htm". The first part of the example URL indicates a given protocol (i.e., "http") to be used in the communication. The second part specifies the domain name (i.e., "www.microsoft.com") where the resource is located. The third part specifies the resource (i.e., a file called "ms.htm") within the domain. Accordingly, a browser generates an HTTP (HyperText Transport Protocol) request associated with the example URL to retrieve the data associated with ms.htm file within the www.microsoft.com domain. A web server hosting the www.microsoft.com site receives the HTTP request and returns the requested web page or resource in an HTTP response to the client system for display in the browser.

The "ms.htm" file of the example above includes static HTML (HyperText Markup Language) code. HTML is a plain-text authoring language used to create documents (e.g., web pages) on the World Wide Web. As such, an HTML file can be retrieved from a web server and displayed as a web page in a browser to present the rich graphical experience that users have come to expect while viewing information from the Internet. Using HTML, a developer can, for example, specify formatted text, lists, forms, tables, hypertext links, inline images and sounds, and background graphics for display in the browser. An HTML file, however, is a static file that does not inherently support dynamic generation of web page content.

If dynamic content is to be displayed, such as a changing stock price or traffic information, a server-side application program is generally developed to handle the more complex client-server interaction. The server-side application program processes an HTTP request and generates the appropriate HTML code for transmission to the client in an HTTP response. An exemplary HTTP request may include parameters, such as data in a query string or data from web-based forms. As such, a server-side application program can process these parameters and dynamically generate HTML code for transmission in an HTTP response to the client. An exemplary server-side application program may generate documents containing appropriate HTML code using a sequence of one or more formatted text write operations to a memory structure. Thereafter, the resulting document is transmitted to a client system in an HTTP response, where it is displayed as a web page in the browser.

Developing a server-side application program can be a complex task requiring not only familiarity with normal HTML coding that is used to layout a Web page, but also with programming basics, including one or more programming languages (e.g., C++, Perl, Visual Basic, or Jscript). Web page designers, on the other hand, are frequently graphics designers and editors, who may lack programming experience. Furthermore, simplifying complex web page development can speed the development of new web content by any developer. Generally, development of a custom server-side application program also requires tremendous effort, so much, in fact, that developers are often disinclined to attempt it. It is desirable, therefore, to provide a development framework that allows a developer to dynamically create and process a web page with minimal programming.

One approach to minimize the programming requirements of dynamic web page generation has been the Active Server Page (ASP) framework, provided by Microsoft Corporation. An ASP resource typically includes Visual Basic or Jscript code, for example, to process an HTTP request that specifies the ASP resource as the desired resource and, thereafter, to generate the resulting HTML code in a HTTP response to the client. Furthermore, an ASP resource may reference pre-developed or third party client-side library components (e.g., client-side ACTIVEX controls) to ease a given application programming effort. However, in the current server-side application frameworks, the programming required to dynamically manage client-side user interface elements (e.g., text boxes, list boxes, buttons, hypertext links, images, sounds, etc.) within server-side applications can still require sophisticated programming skills and considerable effort. An unanswered problem exists in properly encapsulating programming required to process user interface elements, so as to allow the web page developer to focus on other aspects of the web page.

Certain client-side user interface elements include data associated with a server-side datastore, such as a database. An example of such an element may be a client-side table displaying a selection of products and prices from a server-side product database. Another example may include a text box in which a consumer can enter a shipping address to be stored to a server-side customer database for later use. Traditionally, the client-side user-interface elements are written into the page by a page developer, and an application program is written by an application program developer to perform the data communications between the page and the server-side databases. A problem is that both page developing and application program developing require significant development effort and intimate knowledge of the database structures and some level of complicated programming (e.g., through client-side scripting or server-side application programming).

SUMMARY OF THE INVENTION

In accordance with the present invention, the above and other problems are solved by providing hierarchical data binding between one or more server-side control objects and one or more server-side datastores. Hierarchical data binding is supported by automatically creating a binding container for each data object in a data array. Each binding container provides its children with access to its public properties, including the data objects of the server-side datastore with which it is associated. As such, the property of a server-side control object may be bound through its binding container to a property of a server-side datastore. A data binding relationship may be established, without limitation, unidirectionally from a property of the server-side control object to the property of the server-side datastore or vice versa. A data binding relation may also be established, without limitation, bidirectionally between a property of the server-side control object and the property of the server-side datastore.

In one implementation of the present invention, a method of data binding a property of a descendent server-side control object to a property of a data set (e.g., a table row) of a server-side data table having one or more data sets is provided in a server computer coupled to a client computer system. The descendent server-side control object corresponds to a client-side user interface element. An iterating control object iterates over each data set of the server-side data table to create a binding container server-side control object corresponding to each data set. Each binding container server-side control object is associated with a data set of the server-side data table. A descendent server-side control object is created for a property of each data set. A given descendent server-side control object is a descendent of the binding container server-side control object corresponding to a given data set and is associated with a property of the given data set. A data binding relationship is established between the property of the descendent server-side control object and the property of one of the data sets of the server-side data table.

In other implementations of the present invention, articles of manufacture are provided as computer program products. One embodiment of a computer program product provides a computer program storage medium readable by a computer system and encoding a computer program for executing a computer process data binding a property of a descendent server-side control object to a property of a server-side data array having one or more data objects is provided. Another embodiment of a computer program product may be provided in computer data signal embodied in a carrier wave by a computing system and encoding the computer program. The child server-side control object corresponds to a client-side user interface element. The server-side data array is loaded from a server-side database. An iterating server-side control object is associated with the server-side data table and is created into a server-side control object hierarchy. The server-side data array is stored as a property of the iterating server-side control object. A binding container server-side control object corresponding to one of the data objects is created as a child of the iterating server-side control object. The binding container server-side control object is associated with one of the data objects of the server-side data array. A descendent server-side control object is created for each property of each data object. Each descendent server-side control object is a descendent of the binding container server-side control object. A data binding relationship is established between the property of the descendent server-side control object and the property of the server-side data array.

In another implementation, a server for performing server-side data binding using a hierarchy of server-side control objects corresponding to client-side user interface elements is also provided, including a server-side data array having one or more data objects. Each data object may include a property. An iterating server-side control object in a server-side control object hierarchy is associated with the server-side data array. One or more binding container server-side control objects are iteratively created by the iterating server-side control object based on a number of data objects in the server-side data array. One or more descendent server-side control objects corresponds to a property of each data object of the server-side data array. Each descendent server-side control is created as a descendent of the binding control server-side control object of a given data object in the server-side data array. A data binding relationship structure describes a data binding relationship between a property of the descendent control object and the property of the data object of the server-side data array.

BRIEF DESCRIPTION OF THE DRAWINGS

FIG. 6A illustrates an exemplary dynamic content resource (e.g., an ASP+ resource) declaring data bound control objects in an embodiment of the present invention.

FIG. 6B illustrates an exemplary code declaration block declaring a second type of unidirectional data binding to a server-side dated table in an embodiment of present invention.

FIG. 10 illustrates a representation of an exemplary server-side PropertyBindingCollection class in an embodiment of the present invention.

FIG. 11 illustrates a representation of an exemplary server-side PropertyBinding class in an embodiment of the present invention.

DETAILED DESCRIPTION OF THE INVENTION

In an embodiment of the present invention, a web page content is dynamically generated on a web server for display on a client. The client can be, for example, any browser that supports standard HTML or any other authoring language.

The client in the web server communicates across the network, such as by HTTP requests and HTTP responses. As such, the web server generates web page content, possibly in the form of HTML code, and transmits the content to the client, which can display the web page in a browser. Server-side control objects, which may logically correspond to individual user interface elements of the web page, are created on the web server to process and render the web page content. The server-side control objects are declared in a dynamic content resource, such as an ASP+ resource, which is processed by a page factory to create a hierarchy of server-side control object. The control objects in the hierarchy cooperate to process the request received from the client and then generate resulting web page content for transmission to the client, before the control objects in a hierarchy are terminated.

A page object may instantiate as the top level of the control object hierarchy in an embodiment of the present invention. A page object, which is also a control object, typically contains one or more child control objects, and each child control object can contain one or more child control object of its own to extend into the hierarchy of multiple levels. The page object and descendent control objects execute a sequence of operations to process and generate the web content that corresponds to client-side user interface elements.

One of the operations in the sequence includes a data binding operation that controls communications between one or more of the server-side control objects and a server-side datastore. In an embodiment present invention, a server-side datastore is a database storing data related to user interface elements of the web page (e.g., see datastore 131 in FIG. 1). Other non-database types of datastores are also contemplated within the scope of the present invention, including without limitation configuration registries, data files, data streams. By declaring server-side control objects and associated data binding relationships in a dynamic content resource, a page developer can configure a control object hierarchy having unidirectional and/or bidirectional data binding relationships with a server-side data array associated with the server-side datastore.

Figure 1:
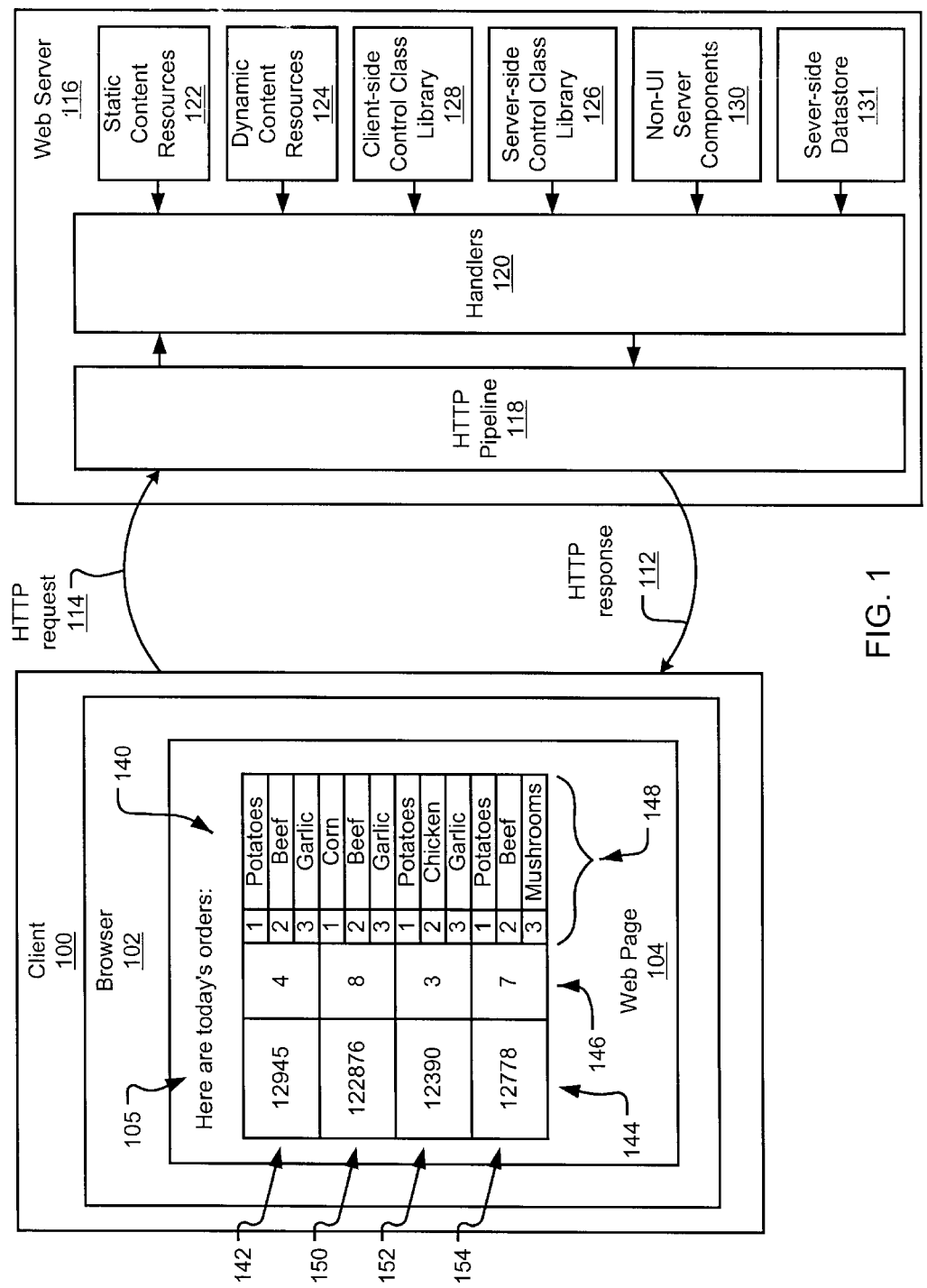
FIG. 1 illustrates a web server for dynamically generating web page content for display on a client in an embodiment of the present invention.

FIG. 1 illustrates a web server for dynamically generating web page content for display on a client in an embodiment of the present invention. A client 100 executes a browser 102 that displays a web page 104 on a display device of the client 100. The client 100 may include a client computer system having a display device, such as a video monitor. An "INTERNET EXPLORER" browser, marketed by Microsoft Corporation, is an example of a browser 102 in an embodiment of the present invention. Other exemplary browsers include without limitation "NETSCAPE NAVIGATOR" and "MOSAIC". The exemplary web page 104 incorporates a table list element 140 having four list row elements. The list row element 142 is a child user interface element contained by the table list element 140. The list row element 142 is defined by a template declaration (see FIG. 6A for an exemplary template declaration) and has two columns containing label elements 144 (e.g., representing an OrderID) and 146 (e.g., representing a quantity of the product ordered), and one column containing a table list element 148. The elements 144, 146, and 148 are declared as child user interface elements contained by the list row element 142 (see FIG. 6A for exemplary label and table list declarations). Additional list row elements 150, 152, and 154 are also shown in web page 104.

In accordance with the declarations of FIG. 6A, server-side control objects corresponding to the user interface elements of the web page 104 are data bound to two server-side data arrays (e.g., server-side data tables, MyOrders and MyItems, associated with server-side database access through the MyOrderSystem object). Generally, a server-side data array is associated with (e.g., loaded from and/or stored to) a server-side datastore and includes an index data set (e.g., data rows or data objects) within the control object hierarchy. Such data sets may have properties, which for example, may represent a data value of a data table row. The column 148 represents a sub-table list element having two columns: (1) a column of row indexes from a bound Items data table; (2) a column of three list row elements containing labels (e.g., item names) from the Items data table.

The browser 102 can receive HTML code in the HTTP response 112 from a web server 116 and displays the web page as described by the HTML code. Although HTML is described with reference to one embodiment, other authoring languages, including without limitation SGML (Standard Generalized Markup Language), XML (eXtensible Markup Language), and WML (Wireless Markup Language), which is an XML-based markup language, designed for specifying the content and user interfaces of narrowband wireless devices, such as pagers and cellular phones, are contemplated within the scope of the present invention. Furthermore, although standard HTML 3.2 is primarily disclosed herein, any version of HTML is supportable within the scoped of the present invention.

The communications between the client 100 and the web server 116 may be conducted using a sequence of HTTP requests 114 and HTTP responses 112. Although HTTP is described with reference to one embodiment, other transport protocols, including without limitation S-HTTP, are contemplated within the scope of the present invention. On the web server 116, an HTTP pipeline module 118 receives an HTTP request 114, resolves the URL, and invokes an appropriate handler 120 for processing the request. In an embodiment of the present invention, a plurality of handlers 120 to handle different types of resources are provided on the web server 116.

For example, if the URL specifies a static content resource 122, such as an HTML file, a handler 120 accesses the static content resource 122 and passes the static content resource 122 back through the HTTP pipeline 118 for communication to the client 100 in an HTTP response 112. Alternatively, in an embodiment of the present invention, if the URL specifies a dynamic content resource 124, such as an ASP+ resource, a handler 120 accesses the dynamic content resource 124, processes the contents of the dynamic content resource 124, and generates the resulting HTML code for the web page 104. In an embodiment of the present invention, the resulting HTML code includes standard HTML 3.2 code. Generally, a dynamic content resource is a server-side declaration datastore that can be used to dynamically generate the authoring language code that describes a web page to be displayed on a client. The HTML code for the web page is then passed through the HTTP pipeline 118 for communication to the client 100 in an HTTP response 112.

During its processing, a handler 120 can also access libraries of pre-developed or third party code to simplify the development effort. One such library is a server-side class control library 126, from which the handler 120 can instantiate server-side control objects for processing user interface elements and generating the resultant HTML data for display of a web page. In an embodiment of the present invention, one or more server-side control objects map to one or more user interface elements, visible or hidden, on the web page described in the dynamic content resource 124. More details about server-side control objects are discussed in previously incorporated U.S. patent application Ser. No. 09/573,769, entitled SERVER-SIDE CONTROL OBJECTS FOR PROCESSING CLIENT-SIDE USER INTERFACE ELEMENTS, incorporated herein by reference for all that is discloses and teaches, filed concurrently herewith, and assigned to the Assignee of the present application.

A second library, in contrast, is a client-side control class library 128, such as a library including "ACTIVEX" components from Microsoft Corporation. An "ACTIVEX" control is a COM ("Component Object Model") object that follows certain standards in how it interacts with its client and other components. A client-side "ACTIVEX" control, for example, is a COM-based component that can be automatically downloaded to a client and executed by a web browser on the client. Server-side ACTIVEX components (not shown) are COM-based components that may be implemented on a server to perform a variety of server-side functions, such as providing the server-side functionality of a stock price look-up application or database component. A more detailed discussion of ACTIVEX can be found in "Understanding ACTIVEX and OLE", David Chappell, Microsoft Press, 1996.

In contrast to "ACTIVEX" controls, a server-side control object in an embodiment of the present invention, being specified in a dynamic content resource 124, logically corresponds to a user interface element that is incorporated in the web page on the client. The server-side control object can also generate valid HTML code that can include, for example, an HTML tag and a locator referencing a given client-side "ACTIVEX" control. If the browser already has the code for the client-side "ACTIVEX" control within its storage system, the browser executes the "ACTIVEX" control within the web page on the client. Otherwise, the browser downloads the code for the "ACTIVEX" control from the resource specified by the locator and then executes the "ACTIVEX" control within the web page on the client. A server-side control object in an embodiment of the present invention can also raise events to a server-side "ACTIVEX" control used to implement a stock look-up application on the server.

A handler 120 also has access to one or more non-user-interface server components 130 that execute on the web server 116 or on another accessible web server. An non-user-interface server component 130, such as a stock price look-up application or database component, may be referenced in or associated with a dynamic content resource 124 that is processed by a handler 120. Server-side events raised by the control objects declared in the dynamic content resource 124 may be processed by server-side code, which calls appropriate methods in the non-user-interface component 130. As a result, the processing provided by the server-side control objects simplifies the programming of the non-user-interface server component 130 by encapsulating the processing and generation of the user interface elements of a web page, which allows the developer of the non-user-interface server component 130 to concentrate on the specific functionality of the application, rather than on user interface issues.

In an embodiment of the present invention, properties of server-side control objects are data bound to properties in a server-side datastore 131. Data binding allows a page developer to associate properties of control objects in the server-side control object hierarchy to data items in a server-side database, for example. During processing, each control object updates its data bound properties by retrieving an associated property value from a data object in the database (referred to as unidirectional data binding from the server-side datastore). Alternatively, each control object updates a property of a server-side datastore using the control object's internal property value (referred to as unidirectional data binding to the server-side data store). The two types of unidirectional data binding can be combined to provide bidirectional data binding between server-side control objects and server-side datastores.

Figure 2:
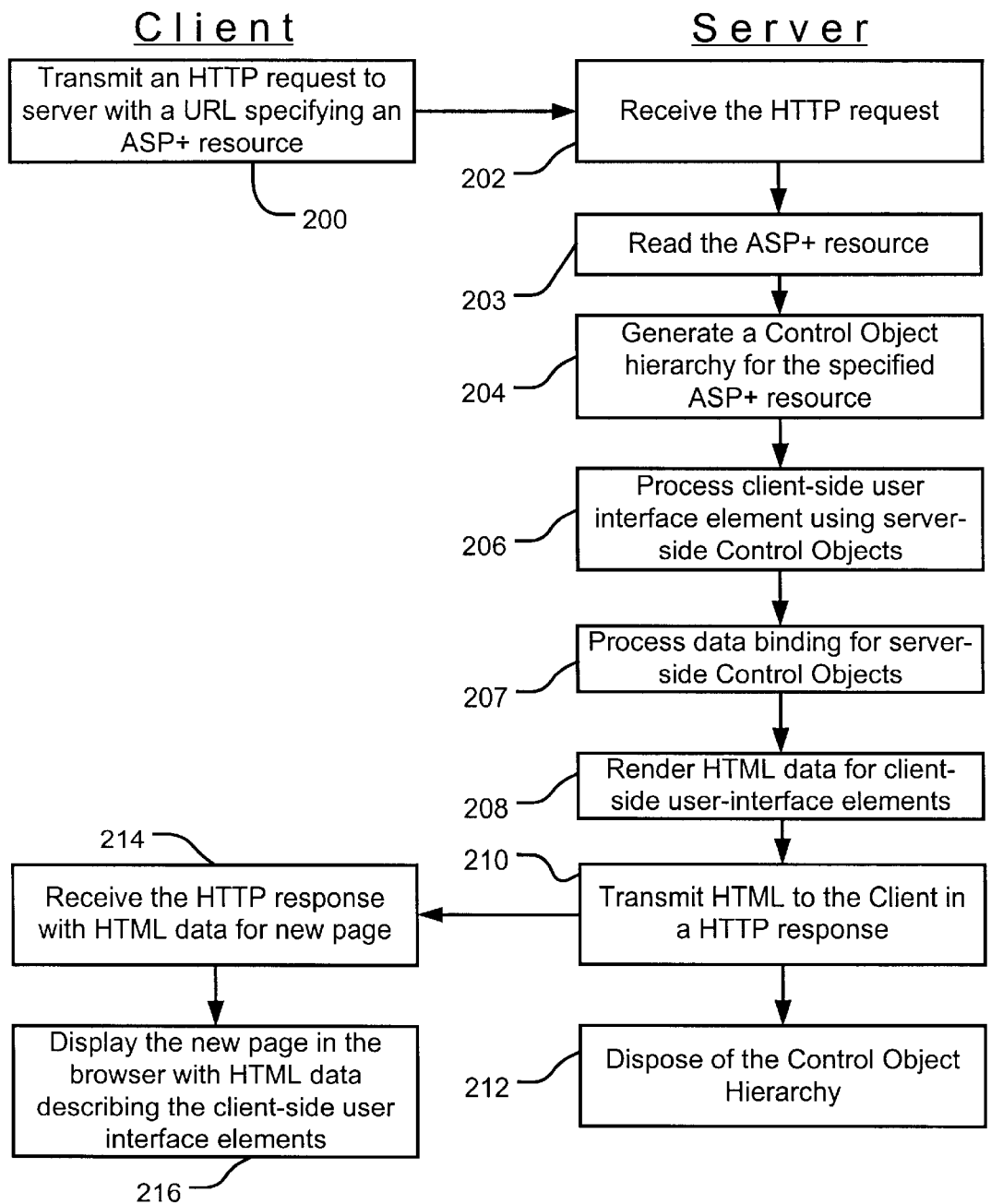
FIG. 2 illustrates a flow diagram of operations for processing and rendering client-side user interface elements using server-side control objects in an embodiment of the present invention.

FIG. 2 illustrates a flow diagram of operations for processing and generating client-side user interface elements using server-side control objects in an embodiment of the present invention. In transmitting operation 200, the client transmits an HTTP request to the server. The HTTP request includes a URL that specifies a resource, such as an ASP+ resource. In receiving operation 202, the server receives the HTTP request and invokes the appropriate handler for processing the specified resource. The ASP+ resource is read in parsing operation 203. Creation operation 204 generates a server-side control object hierarchy based on the contents of the specified dynamic content resource (e.g., the ASP+ resource).

In operation 206, the server-side control objects of the control object hierarchy perform one or more of the following operations: postback event handling, postback data handling, state management, and data binding. Postback events and data (collectively "postback input") from user interface elements are communicated from the client to the server for processing. A postback event, for example, may include without limitation a "mouse click" event from a client-side button element or a "data change" event from a client-side textbox element that is communicated to the server. Postback data, for example, may include without limitation text entered by a user in a text box element or an index of an item selected from a drop-down box.

In operation 208, each server-side control object in the hierarchy is called to generate (or render) data, such as HTML code, for display of client-side user interface elements in the web page. Note that, although the term "render" may be used to describe the operation of displaying graphics on a user interface, the term "render" is also used herein to describe the operation of generating authoring language data that can be interpreted by client-application, such as a browser, for display and client-side functionality. A more detailed discussion of the processing operation 206 and the rendering operation 208 is provided in association with FIG. 6. In one embodiment, calls to render( ) methods in individual control objects are performed using a tree traversal sequence. That is, a call to the render( ) method of a page object results in recursive traversal throughout appropriate server-side control objects in the hierarchy. Alternative methods for calling the render( ) methods for appropriate control objects may also be employed, including an event signaling or object registration approach. The parentheses designate the "render( )" label as indicating a method, as compared to a data value.

In an embodiment of the present invention, the actual creation of the individual server-side control objects may be deferred until the server-side control object is accessed (such as when handling postback input, loading a state, rendering HTML code from the control object, etc.) in operations 206 or 208. If a server-side control object is never accessed for a given request, deferred control object creation optimizes server processing by eliminating an unnecessary object creation operation. More details on deferred control object creation and postback input handling can be found in U.S.

patent application Ser. No. 09/574,165, entitled POSTBACK INPUT HANDLING BY SERVER-SIDE CONTROL OBJECTS, incorporated herein by reference for all that it discloses and teaches, filed concurrently herewith, and assigned to the Assignee of the present application.

Transmitting operation 210 transmits the HTML code to the client in an HTTP response. In receiving operation 214, the client receives the HTML code associated with a new web page to be displayed. In display operation 216, the client system incorporates (e.g., displays) the user interface elements of the new page in accordance with the HTML code received from the HTTP response. It should be understood, however, that incorporation of a user-interface element may include non-display operations, such as providing audio or tactile output, reading and writing to memory, controlling the operation of scripts, etc. In termination operation 212, the server-side control object hierarchy is terminated. In an embodiment of the present invention, server-side control objects in the hierarchy are created in response to an HTTP request referencing an associated ASP+ resource, and destroyed subsequent to the rendering of authoring language data (e.g., HTML data). In an alternative embodiment, operation 212 may be performed after operation 208 and before operation 210.

Figure 3:
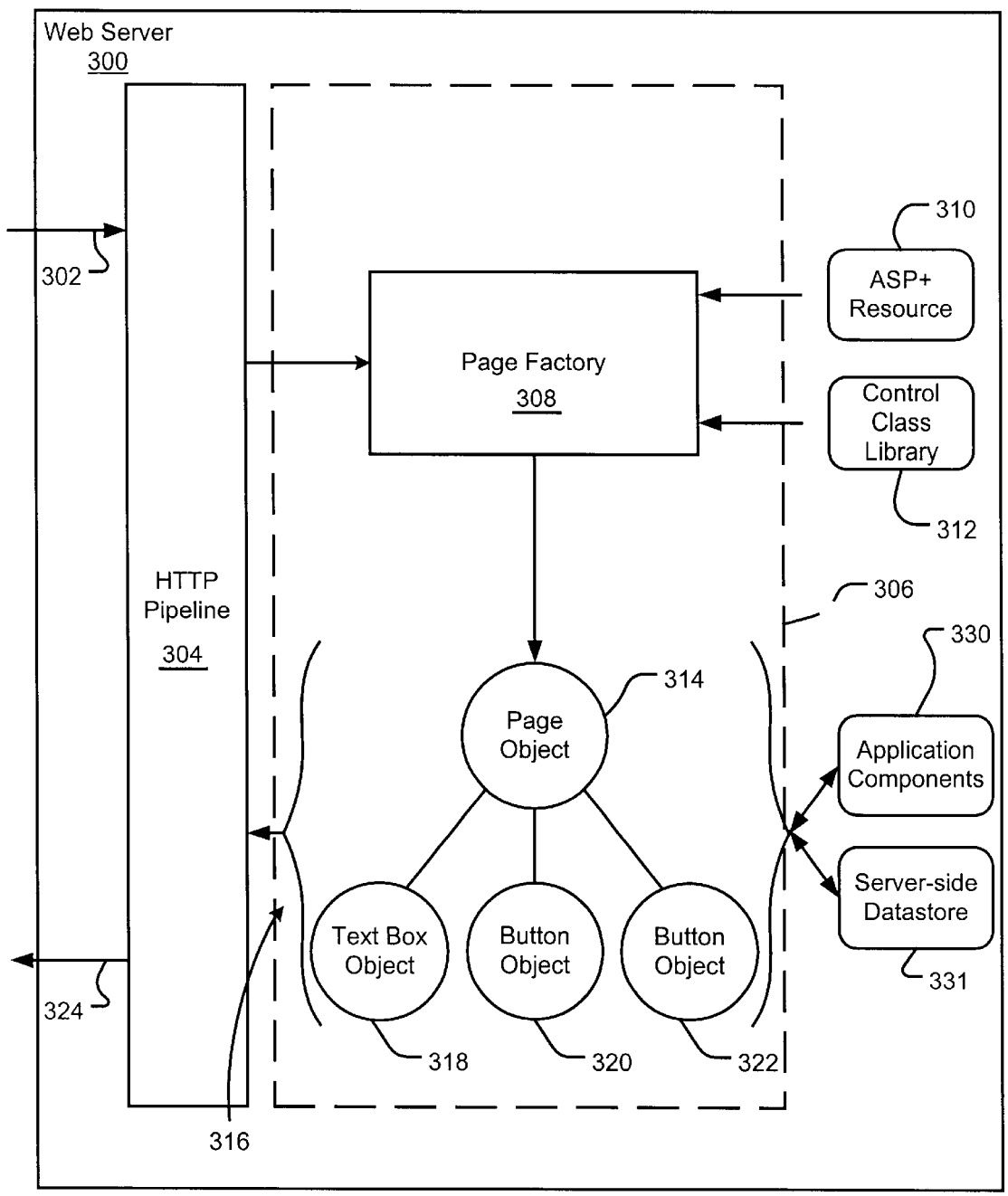
FIG. 3 illustrates exemplary modules in a web server used in an embodiment of the present invention.

FIG. 3 illustrates exemplary modules in a web server used in an embodiment of the present invention. The web server 300 receives an HTTP request 302 into the HTTP pipeline 304. The HTTP pipeline 304 may include various modules, such as modules for logging of web page statistics, user authentication, user authorization, and output caching of web pages. Each incoming HTTP request 302 received by the web server 300 is ultimately processed by a specific instance of an IHTTPHandler class (shown as handler 306). The handler 306 resolves the URL request and invokes an appropriate handler factory (e.g., a page factory module 308).

In FIG. 3, a page factory module 308 associated with the ASP+ resource 310 is invoked to handle the instantiation and configuration of the ASP+ resource 310. In one embodiment, an ASP+ resource can be identified by designating a particular suffix (or a file extension such as ".aspx") with the resource. When a request for a given ASP+ resource is first received by the page factory module 308, the page factory module 308 searches the file system for the appropriate file (e.g., the .aspx file 310). The file may contain text (e.g., authoring language data) or another data format (e.g., byte-code data or encoded data) that may later be interpreted or accessed by the server to service the request. If the physical file exists, the page factory module 308 opens the file and reads the file into memory. If the file cannot be found, the page factory module 308 returns an appropriate "file not found" error message.

After reading the ASP+ resource 310 into memory, the page factory module 308 processes the file content to build a data model of the page (e.g., lists of script blocks, directives, static text regions, hierarchical server-side control objects, server-side control properties, etc.). The data model is used to generate a source listing of a new object class, such as a COM+ ("Component Object Model+") class, that extends the page base class. The page base class includes code that defines the structure, properties, and functionality of a basic page object. In an embodiment of the present invention, the source listing is then dynamically compiled into an intermediate language and later Just-In-Time compiled into platform native instructions (e.g., X86, Alpha, etc.). An intermediate language may include general or custom-built language code, such as COM+ IL code, Java bytecodes, Modula 3 code, SmallTalk code, and Visual Basic code. In an alternative embodiment, the intermediate language operations may be omitted, so that the native instructions are generated directly from the source listing or the source file (e.g., the ASP+ resource 310). A control class library 312 may be accessed by the page factory module 308 to obtain predefined server-side control classes used in the generation of the control object hierarchy. For more details about the page compiler, see U.S. patent application Ser. No. 09/573,768, entitled SERVER-SIDE CODE GENERATION FROM A DYNAMIC WEB PAGE CONTENT FILE, filed concurrently herewith and assigned to the Assignee of the present application.

The page factory module 308 outputs a page object 314, which is a server-side control object that corresponds to the web page 104 of FIG. 1. The page object 314 and its children comprise an exemplary control object hierarchy 316. Other exemplary control objects are also contemplated in accordance with the present invention, including without limitation objects corresponding to the HTML controls in Table 1, as well as custom control objects. The page object 314 logically corresponds to the web page 104 of FIG. 1 and is hierarchically related to other control objects on the server. In one embodiment, a page object is a container object that hierarchically contains its children control objects. In an alternative embodiment, other forms of hierarchical relation may be employed, including a dependency relationship. In a more complex control object hierarchy with multiple levels of children, a child object can be a container object for other child objects (e.g., the table list 140 is a container for the list row elements 142, 150, 152, and 154 and their children). These server-side control objects cooperate to handle input from the HTTP request 302, to manage the states of server-side control objects, to perform data binding, and to render authoring language data (e.g., HTML) for a resulting web page for the client. The resulting HTML code is output from the control object hierarchy 316 and transmitted to the client in an HTTP response 324.

In the illustrated embodiment, the control objects in the control object hierarchy 316 are created and executed on the server 300, and each server-side control object logically corresponds to a user interface element on the client. The server-side control objects also cooperate to handle postback input from the HTTP request 302, to manage the states of server-side control objects, to perform data binding with server-side databases, and to generate authoring language data (e.g., HTML code) used to display a resulting web page at the client. The resulting authoring language data is generated (i.e., rendered) from the server-side control object hierarchy 316 and transmitted to the client in an HTTP response 324. For example, resulting HTML code may embody any valid HTML construct and may reference ACTIVEX-type control, JAVA applets, scripts, and any other web resources that yield client-side user interface elements (e.g., control buttons, text boxes, etc.) when processed by a browser.

By virtue of declarations made in the ASP+ resource 310, server-side control objects may also access one or more non-user-interface server components 330 to provide interaction between the non-user-interface server component 330 and client-side user interface elements. For example, in response to postback input, server-side control objects can raise server-side events to the non-user-interface server components registered for those events. In this manner, the non-user-interface server component 330 can interact with the user through user interface elements without programming the code required to display and process these elements.

Properties of one or more server-side datastores 331 may be data bound to properties of the server-side control objects. A detailed discussion of an exemplary server-side control object hierarchy configured to support an embodiment of data binding is provided with regard to FIG. 7. The data binding relationships may be declared in the ASP+ resource and established during the compilation and runtime execution of the server-side control objects.

In summary, an embodiment of the present invention includes server-side control objects that are created and executed on the server to generate HTML code that is sent to a client. The HTML code may, for example, embody any valid HTML constructs and may reference ACTIVEX-type controls, JAVA applets, scripts, and any other web resources to produce user interface buttons and other user interface elements at the client. A user at a client may interact with these user interface elements, which logically corresponds to the server-side control objects, and send a request back to the server. The server-side control objects are recreated on the server to process the data, events, and other characteristics of the user interface elements so as to generate the next round of HTML code to be transmitted in response to the client.

Figure 4:
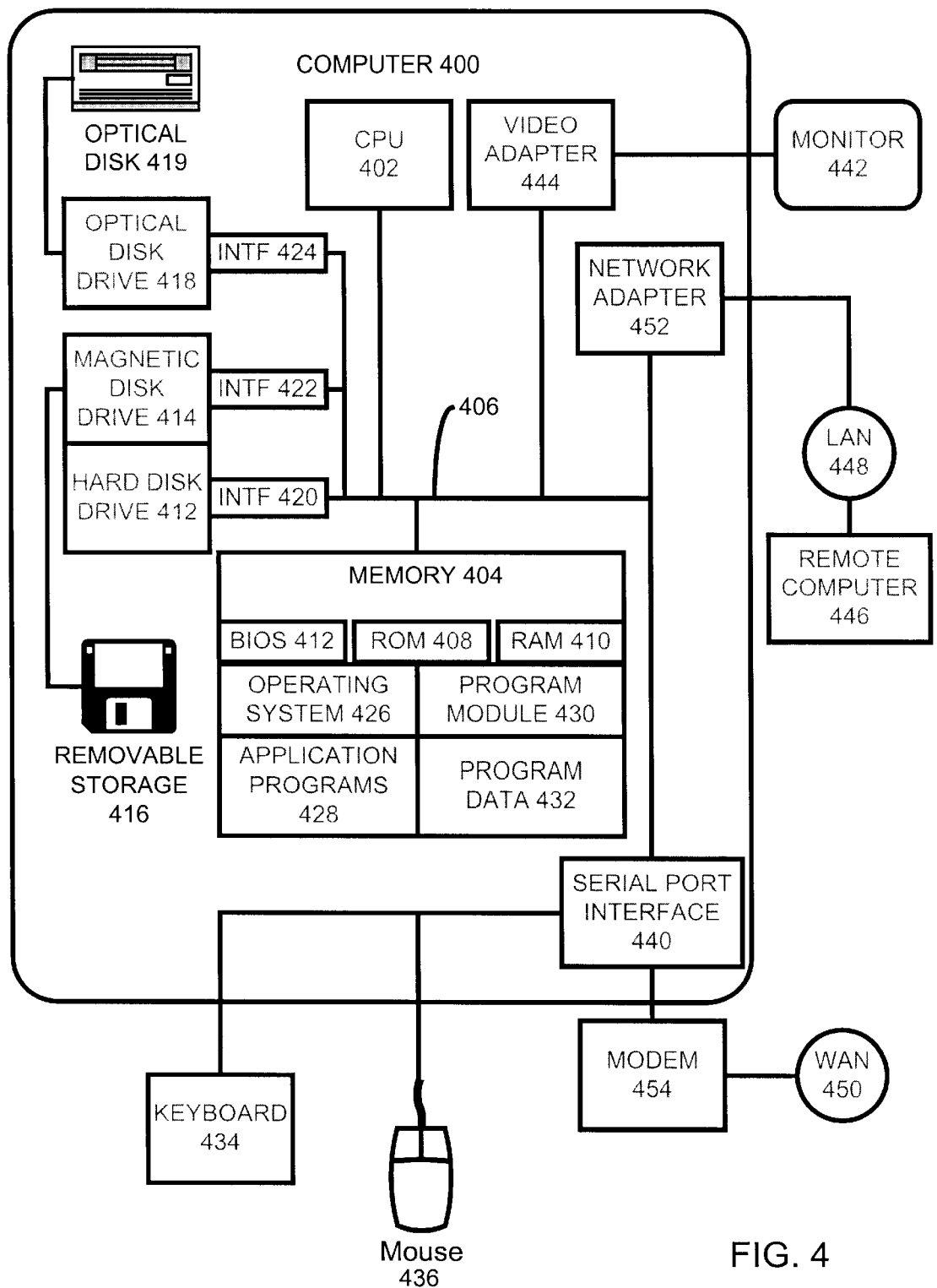
FIG. 4 illustrates an exemplary system useful for implementing an embodiment of the present invention.

With reference to FIG. 4, an exemplary computing system for embodiments of the invention includes a general purpose computing device in the form of a conventional computer system 400, including a processor unit 402, a system memory 404, and a system bus 406 that couples various system components including the system memory 404 to the processor unit 400. The system bus 406 may be any of several types of bus structures including a memory bus or memory controller, a peripheral bus and a local bus using any of a variety of bus architectures. The system memory includes read only memory (ROM) 408 and random access memory (RAM) 410. A basic input/output system 412 (BIOS), which contains basic routines that help transfer information between elements within the computer system 400, is stored in ROM 408.

The computer system 400 further includes a hard disk drive 412 for reading from and writing to a hard disk, a magnetic disk drive 414 for reading from or writing to a removable magnetic disk 416, and an optical disk drive 418 for reading from or writing to a removable optical disk 419 such as a CD ROM, DVD, or other optical media. The hard disk drive 412, magnetic disk drive 414, and optical disk drive 418 are connected to the system bus 406 by a hard disk drive interface 420, a magnetic disk drive interface 422, and an optical drive interface 424, respectively. The drives and their associated computer-readable media provide nonvolatile storage of computer readable instructions, data structures, programs, and other data for the computer system 400.

Although the exemplary environment described herein employs a hard disk, a removable magnetic disk 416, and a removable optical disk 419, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 416, optical disk 419, ROM 408 or RAM 410, including an operating system 426, one or more application programs 428, other program modules 430, and program data 432. A user may enter commands and information into the computer system 400 through input devices such as a keyboard 434 and mouse 436 or other pointing device. Examples of other input devices may include a microphone, joystick, game pad, satellite dish, and scanner. These and other input devices are often connected to the processing unit 402 through a serial port interface 440 that is coupled to the system bus 406. Nevertheless, these input devices also may be connected by other interfaces, such as a parallel port, game port, or a universal serial bus (USB). A monitor 442 or other type of display device is also connected to the system bus 406 via an interface, such as a video adapter 444. In addition to the monitor 442, computer systems typically include other peripheral output devices (not shown), such as speakers and printers.

The computer system 400 may operate in a networked environment using logical connections to one or more remote computers, such as a remote computer 446. The remote computer 446 may be a computer system, a server, a router, a network PC, a peer device or other common network node, and typically includes many or all of the elements described above relative to the computer system 400. The network connections include a local area network (LAN) 448 and a wide area network (WAN) 450. Such networking environments are commonplace in offices, enterprise-wide computer networks, intranets, and the Internet.

When used in a LAN networking environment, the computer system 400 is connected to the local network 448 through a network interface or adapter 452. When used in a WAN networking environment, the computer system 400 typically includes a modem 454 or other means for establishing communications over the wide area network 450, such as the Internet. The modem 454, which may be internal or external, is connected to the system bus 406 via the serial port interface 440. In a networked environment, program modules depicted relative to the computer system 400, or portions thereof, may be stored in the remote memory storage device. It will be appreciated that the network connections shown are exemplary, and other means of establishing a communication link between the computers may be used.

In an embodiment of the present invention, the computer 400 represents a web server, wherein the processor 402 executes a page factory module on an ASP+ resource stored on at least one of storage media 416, 412, 414, 418, 419, or memory 404. HTTP responses and requests are communicated over the LAN 448, which is coupled to a client computer 446.

Figure 5:
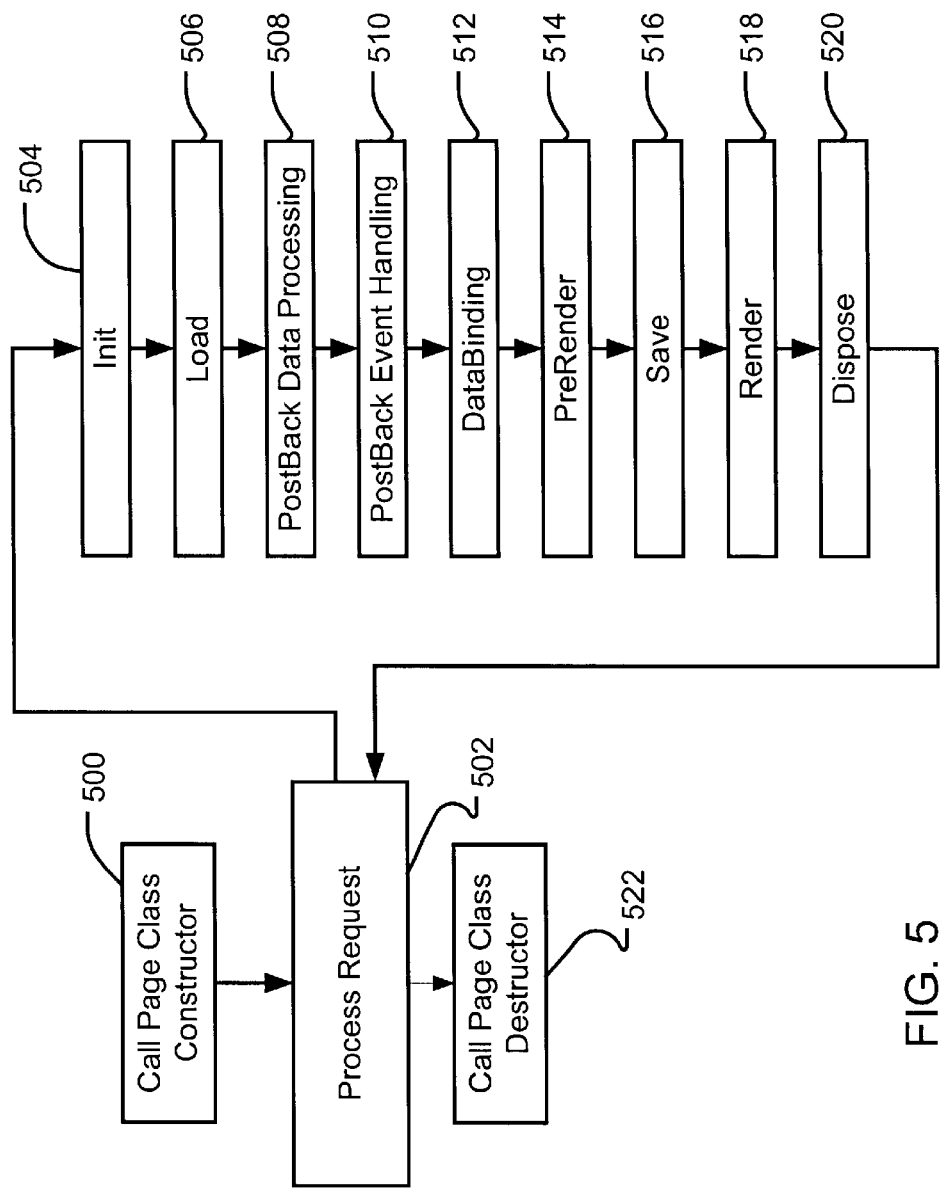
FIG. 5 illustrates an operation flow diagram representing processing of a page object in an embodiment of the present invention.

FIG. 5 illustrates an operation flow diagram representing server-side processing of a page object and other control objects in an embodiment of the present invention. In operation 500, a page object constructor is called by the page factory module 308 (see FIG. 3). As a result, a page object (see e.g., the page object 314 in FIG. 3) is created to logically correspond to the web page user-interface element on the client. In operation 502, the page factory module calls the ProcessRequest member function of the page object, which initiates the staged operations for processing the HTTP request received from a client. In a first stage of one embodiment of the present invention, a server-side Create operation (not shown) creates the descendant server-side control objects contained in the control object hierarchy of the page object, that is, constructors for child control objects are recursively called to create the control objects during the lifetime of the processing of the HTTP request.

In an alternate embodiment, however, creation of child control objects is deferred until the control object is required for a given processing step (e.g., handling a postback event, handling postback data, loading or saving a viewstate, resolving data binding, or rendering HTML code for the corresponding user interface element). The latter embodiment, which is said to implement "deferred control object creation", is an optimization that can alleviate unnecessary CPU and memory utilization. For example, a user input event received from the client may result in the creation of a completely different web page. In this case, it is unnecessary to instantiate an entire control object hierarchy of the previous page only to process an event that immediately results in the termination of the control object hierarchy and the instantiation of a new and different control object hierarchy for a new page.

In response to the server call to the page object's ProcessRequest method, operations 504 through 520 may be executed by the page object and by individual descendant control objects, depending in part on the data of a given HTTP request. In an embodiment of the present invention, the operations 504–520 are performed for each individual object in the order illustrated in FIG. 5; however, a given operation for one object may occur out of order or not at all with respect to a given operation of another object, depending on the HTTP request. For example, a first object may perform its Init operation 504 and its Load operation 506, and begin postback data processing operation 508, before a descendant control object performs its own Init operation 504 and Load operation 506 by virtue of deferred control object creation. The order of operation processing by the page object and descendent control objects depends on various factors, including without limitation the nature of the data in the HTTP request, the configuration of the control object hierarchy, the current state of the control objects, and whether deferred control The Init operation 504 initializes a control object after it is created by executing any server-side code associated with initialization in the dynamic content resource. In this manner, each server-side control object may be customized with specific server-side functionality that is declared in the dynamic content resource. In an embodiment of the present invention, dynamic content code intended to customize or extend the base page control classes as declared by the page developer in the ASP+ resource on the server. When the ASP+ resource is compiled, the declared code is included in the appropriate initialization code (e.g., the Init( ) methods of the page object and the descendent control objects). The Init operation 504 executes this code to customize or extend the page base class and the base classes for descendent control objects.

In an embodiment of the present invention, state management of the server-side control objects is supported in a Load operation 506 and a Save operation 516, which use a transportable state structure to accommodate the stateless model for client server systems by restoring server-side control objects to their previous state. In one embodiment, the state is communicated to and from the server in one or more hidden HTML fields of an HTTP request/response pair or in another transportable state structure, although other transportable state structures are contemplated within the scope of the present invention.

In a given sequence of requests and responses relating to the current page between a client and a server, the states of one or more control objects are recorded into a transportable state structure by the Save operation 516 after the processing of a previous request. In an embodiment of the present invention, additional state information is also included in the transportable state structure, including hierarchical information or control object identifiers to allow the server to associate a given state with the appropriate control object. In a subsequent HTTP request, the state information is returned to the server in the transportable state structure. The server extracts the state information from the received transportable state structure and loads the state data into the appropriate control objects within the control object hierarchy to restore each control object to its state as it existed prior to a previous HTTP response. After the current request is processed, the states of one or more server-side control objects are again recorded into the transportable state structure by the Save operation 516, and the transportable state structure is returned to the client in the next HTTP response.

As a result of the Load operation 506, each server-side control object is placed in a state consistent with its state prior to a previous HTTP response. For example, if a text box control object includes a property value equaling "JDoe" prior to a previous HTTP response, the Load operation 506 restores the same control object to its previous state, in part by loading the text string "JDoe" into the property value. In addition, whether the state of a given object is stored and restored is configurable.

In summary of one embodiment of the present invention, the state of one or more server-side control objects is "saved" after processing. The saved state information is transmitted to the client in a response. The client returns the saved state information to the server in a subsequent response. The server loads the state information a freshly instantiated server-side control object hierarchy, such that the state of the hierarchy is restored to its previous state. More details on state management can be found in U.S. patent application No. Ser. 09/574,144, entitled STATE MANAGEMENT OF SERVER_SIDE CONTROL OBJECTS, incorporated herein by reference for all that it discloses and teaches, filed concurrently herewith, and assigned to the Assignee of the present application.

An alternative embodiment may maintain the state information on the server or at some other web location accessible by the server during the round trip from the server to the client, and then back to the server. After the client request is received by the server, this state information may be retrieved by the server and loaded into the appropriate server-side control object(s) in the control object hierarchy.

In operation 508, postback data received from the HTTP request is processed. Postback data may be included in the payload of the HTTP request in key-value pairs, in a hierarchical representation (e.g., XML), or in other data representations, such as RDF ("Resource Description Framework"). Operation 508 parses the payload to identify a unique identifier of a target server-side control object. If the identifier (e.g. "page:tablelist1:listrow2:label1") is found and the target server-side control object exists in the control object hierarchy, the corresponding postback data is passed to the control object. For example, referring to FIG. 1, a unique identifier and corresponding data (i.e., "12945") associated with a data item of list row 142 and column 144 is communicated in the payload of the HTTP request 114 to the web server 116. Operation 508 parses the payload of the HTTP request 114 and obtains the unique identifier of the table list 140 and its associated values (i.e., HTML code for the child user interface elements, such as list row 142). Operation 508 then resolves the unique identifier of the list row 142 to identify and traverse to the corresponding target server-side control object, passing a post back value to the target control object for processing.

As discussed with regard to the Load operation 506, the property values of server-side control objects may be restored to their previous states. In response to the receipt of postback data, the server-side control object determines whether the passed-in postback value causes a change from the corresponding property's previous value. If so, the change is logged in a change list to indicate a data change for the associated control object. After all postback data has been processed within the control object hierarchy, a call may be made to a control object method to raise one or more postback data changed events to one or more non-user-interface server components, such as a stock price look-up application running on the server. An example of a postback data changed event is an event indicating that postback data has caused a property of a server-side control object to change. In an exemplary embodiment, such an event can be sent to a system-provided event queue so that server-side code, which may be registered to process the event, can be invoked. The server-side code may them call a method of the non-user-interface server component. In this manner, a server-side non-user-interface server component can respond to events triggered by a change in data of a server-side control object. Alternative methods of implementing events are also contemplated in the scope of the present invention, including using application-provided event queues, polling, and processing interrupts.

In operation 510, postback events are handled. Postback events are communicated in the payload of the HTTP request. Operation 510 parses a specified event target (e.g., labeled "_EVENTTARGET" in an embodiment of the present invention) identifying the server-side control object to which the event is directed. Furthermore, operation 510 parses the located event arguments, if any, and provides the event argument (e.g., labeled "_EVENTARGUMENT" in an embodiment of the present invention) to the specified server-side control object. The control object raises its events for processing by a non-user-interface server component associated with the dynamic content resource. More details on postback data and event processing are described in previously incorporated U.S. patent application Ser. No. 09/574,165, entitled POSTBACK INPUT HANDLING BY SERVER-SIDE CONTROL OBJECTS.

Operation 512 resolves data binding relationships between the server-side control objects and one or more server-side databases accessible by the server, thereby updating in control object properties with database values and/or updating database fields with values of control object properties. In an embodiment of the present invention, properties of server-side control objects may be associated (or data bound) to properties of a parent data binding container, such as a table in a server-side application database. During the data binding operation 512, the page framework may update a data bound control object property with the value of the corresponding parent data binding container property. In this manner, user interface elements on the web page of the next response accurately reflect updated property values, because the control object properties to which the user interface elements correspond have been automatically updated during the data binding operation 512. Likewise, control object properties can also be updated to the parent data binding container fields, thereby updating a server-side application database with postback input from a server-side control object.

A data binding relationship between a given server-control object and a given data source (e.g., a server-side dated table) is declared in the ASP+ resource (see, for example, line 14 in FIG. 6A). To support the commonly hierarchical nature of bound data in a web page, the data binding relationship may support a hierarchy of its own (see discussion of FIG. 7). In the control object hierarchy, the data binding relationships identify the data table and its property to which a property of a server-side control object is bound. A data binding relationship may also be bidirectional, meaning that: (1) an property value of a server-side data table may be loaded into the bound property of a server-side control object; and (2) a property value of a server-side control object may be loaded into the bound property of a server-side dated table. All server-side control objects accurately reflect appropriately updated data bound property values from a server-side dated table after the data binding operation 512.

Operation 514 performs miscellaneous update operations that may be executed before the control object state is saved and the output is rendered. Operation 516 requests state information (i.e., viewstate) from one or more control objects in the control object hierarchy and stores the state information for insertion into a transportable state structure that is communicated to the client in the HTTP response payload. For example, a "grid" control object may save a current index page of a list of values so that the "grid" control object may be restored to this state after a subsequent HTTP request (i.e., in operation 506). As described above, the viewstate information represents the state of the control object hierarchy prior to any subsequent actions by the client. When the viewstate information is returned, it will be used to place the control object hierarchy in that previous state prior to processing any client postback input or databinding.

The render operation 518 generates the appropriate authoring language output (e.g., HTML data) for communication to the client in an HTTP response. Rendering is accomplished through a top-down hierarchical tree walk of all server-side control objects and embedded rendering code. Operation 520 performs any final cleanup work (e.g., closing files or database connections) before the control object hierarchy is terminated. Processing then returns to operation 502 and proceeds to operation 522, where the page object is terminated by calling its destructor.

FIG. 6A illustrates an exemplary dynamic content resource (e.g., an ASP+ resource) declaring data bound control objects on a server in an embodiment of the present invention. Line 1 includes the starting tag of an HTML file, <html>, as a literal. Lines 2–8 represent a code declaration block for code that populates local "MyOrders" and "MyItems" data arrays. Specifically, line 2 declares the server-side code as a server-side script by virtue of the "runat=server" attribute and value. The script overrides the Load operation 506 of FIG. 5 of the page object. Lines 3–5 declare public objects accessible within the name space of the server-side control objects. Line 3 declares a public object, "MyOrderSystem" of type "OrderSystem", which is used in line 7 to retrieve from a server-side datastore the data array that is declared in line 4 as the public data array object, "MyOrders". In line 8, the public object, "MyOrderSystem", is also used to retrieve from a server-side datastore a data array that is declared in line 5 as the public data array object, "MyItems".

Line 11 includes a literal that is the starting tag, <body>, of the body of an HTML file. Line 12 includes literal HTML code defining a header, "H1", for display on the web page. Line 13 includes a declaration of a server-side form control object. Line 14 declares a server-side table list control object having a data binding data source property equaling "Page. MyOrders". Therefore, the MyOrders data table is declared the data source for the table list control object and its descendants.

The in-line template declaration of lines 15–24 declares one or more child control objects of the table list control object declared in line 14. The template declaration is interpreted at parse time to dynamically bind an appropriate ITemplate interface instance to a property of the same name in the iterating control object (e.g., the table list control object). The table list control object (i.e., an iterating control object) uses the ITemplate instance at runtime to create and initialize 0 to N new instances of the appropriate template control class. The number of new instances created may be controlled by the number of corresponding data sets (e.g., data rows) in the data source.

For example, lines 15–24 declare a template, called "itemtemplate", for the list row control objects of the table list control object declared in line 14. The parameters of the template control object are declared in lines 16–22, indicating a list row control object including an OrderID label control object, a Quantity label control object, and another table list control object. The table list control object declared in line 14 iterates through the data sets of the data table MyOrders to create a descendent list row control object for each data set.

The list row control objects corresponding to the itemtemplate template are developed by a control object developer as IBindingContainer instances and are therefore deemed "binding containers". During the load operation 506 of FIG. 5, the MyOrders data table is populated from the MyOrderSystem by the code in line 7. For example, the data provided by the MyOrdersSystem object may be extracted from a server-side database containing order and product data. Thereafter, the table list control object creates a list row control object, as a binding container, for each data set of the data table MyOrders.

The OrderID control object declared in line 16 is bound to the OrderID property of data sets in the MyOrders data table. A hierarchical data binding relationship between the OrderID label control object and the list row control object, defined by a PropertyBinding object of the OrderID label control object, establishes that the Text property of the label control object declared in line 20 is data bound to a data item property identified as "OrderID". The hierarchical data binding relationship also specifies that the data item property is a property of control object's binding container, namely the MyOrders data table. Although the property of the MyOrders data table that is bound to be OrderID control object is a data item, any public properties of a server side data array (e.g., a data table or another type of data object) may be bound to a property of a server-side control object, including a row index, a data value size, data value type, etc.

The Quantity control object declared in line 17 is bound to the Quantity property of data sets in the MyOrders data table. A hierarchical data binding relationship between the Quantity label control object and the list row control object, defined by a PropertyBinding object of the Quantity label control object, establishes that the Text property of the label control object declared in line 17 is data bound to a data item property identified as "Quantity". The hierarchical data binding relationship also specifies that the data item property is a property of the Quantity label control object's binding container, namely the MyOrders data table. Although the property of the MyOrders data table that is bound to be Quantity label control object is a data item, any public properties of a server side data array (e.g., a data table or another type of data object) may be bound to a property of a server-side control object, including a data set index, a data value size, data value type, etc.

Line 18 includes a declaration of a server-side table list control object having a data binding data source property equaling "Page.MyItems". Therefore, the MyItems is declared the data source for the table list control object and its descendants. The in-line template declaration of lines 19–22 declares one or more child control objects of the table list control object declared in line 18. The table list control object (i.e., another iterating control object) uses a template instance associated with the in-line template declaration to create and initialize 0 to M new instances of the appropriate template control class. The number of new instances created may be controlled by the number of corresponding data sets in the data source.

The parameters of the template control object are defined in lines 20–21, indicating a list row control object including an Index label (i.e., corresponding to an ordinal index of a given data set) and an Item label displaying the text of a data item property from the data source. For each data set in the data table MyItems, a list row control object is created under the table list control object declared in line 18. The remaining lines in the file 600 including closing tags to close the nested declarations within the file.

The ASP+ resource 600 illustrates declarations and server-side scripting for implementing unidirectional data binding (i.e., sending data from a server-side data table to the control object hierarchy) in an embodiment of the present invention. In an alternative embodiment, unidirectional data binding in the opposite direction (i.e., sending data from the control object hierarchy to a server-side data table) or bidirectional data binding (i.e., sending data in both directions) may be declared.

To effect the first type of unidirectional binding (i.e., toward the control object), code on line 7 overrides the Load( ) subroutine, for example, to load a snapshot data array of the orders from the MyOrderSystem data table into the local MyOrders data array (i.e., the first type of unidirectional data binding discussed). Thereafter, during the data binding stage, server-side control object properties may be updated from values from the local MyOrders data array, in accordance with the data binding statements on lines 14, 16, 17, 18, 20, and 21.

To effect the second type of unidirectional data binding (i.e., from the control object), a page developer may override the Save( ) subroutine of the page object (see Save operation 516 of FIG. 5). Previously, during the data binding stage, local MyOrders and MyItems data arrays may have been updated with values from server-side control object properties, in accordance with the data binding statements on lines 14, 16, 17, 18, 20, and 21. Thereafter, the overridden Save( ) subroutine loads the values of the local data array into the data tables of the MyOrderSystem object. An exemplary code declaration block overriding the Save( ) subroutine of the page object is shown in lines 6–9 in the ASP+ resource 602 of FIG. 6B. This type of unidirectional binding may be used, for example, to load orders into a server-side database. To declare bidirectional data binding, a page developer may override both the Load( ) and Save( ) subroutines of the page object.

Figure 7:
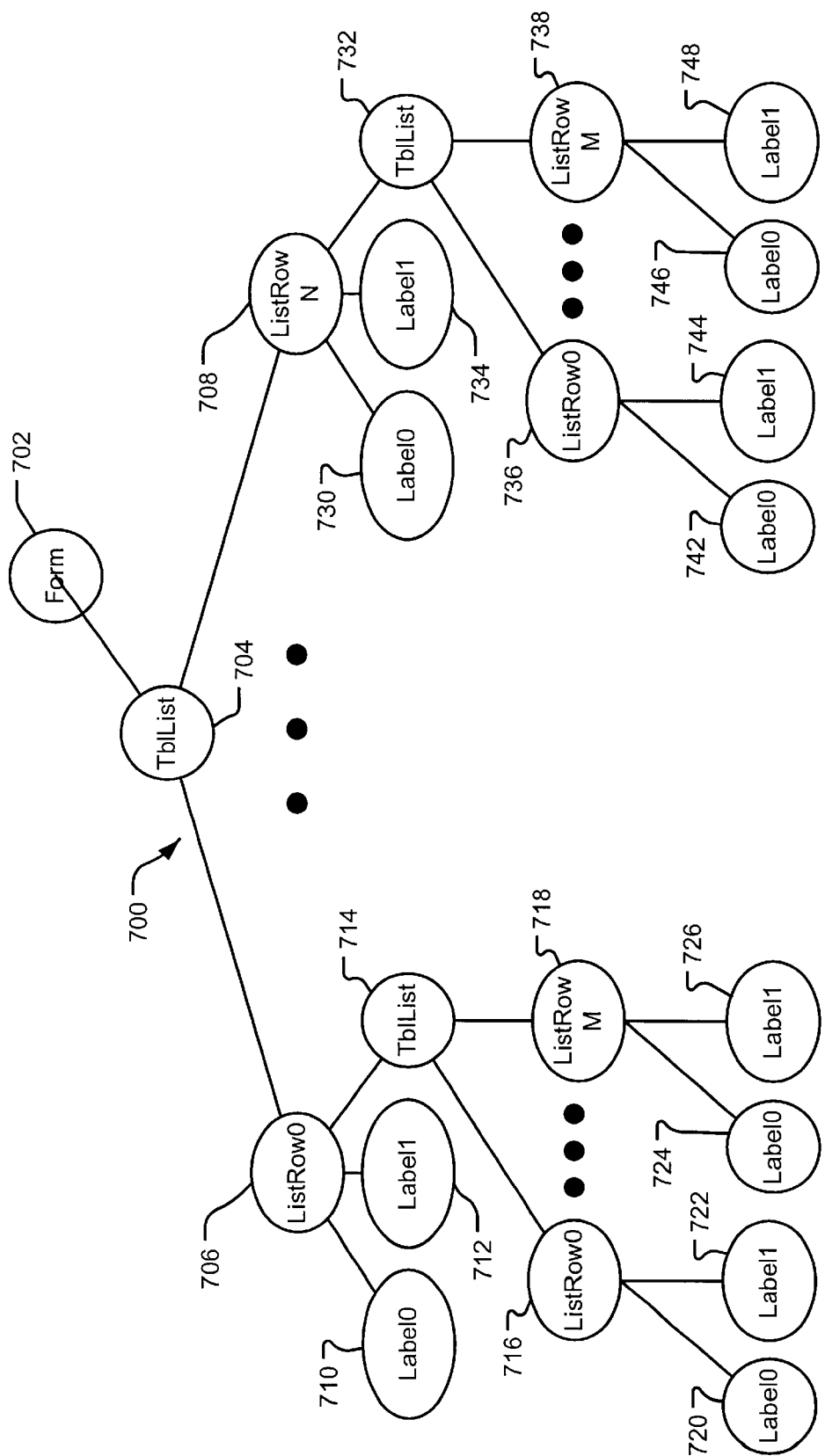
FIG. 7 illustrates a partial control object hierarchy resulting from the processing of the exemplary dynamic content resource (e.g., an ASP+ resource) of FIG. 6A in an embodiment of the present invention.

FIG. 7 illustrates a partial control object hierarchy resulting from the processing of the exemplary dynamic content resource (e.g., an ASP+ resource) of FIG. 6A in an embodiment of the present invention. The top-level page control object and various literal control objects are omitted from the control object hierarchy 700. A form control object 702, corresponding to the form declaration starting at line 11 of FIG. 6A, contains a table list control object 704. The table list control object 704 is declared starting at line 12 of FIG. 6A to have a data binding property equaling the MyOrders data table.

The table list control object 704 contains list row control objects 706–708 (i.e., ListRow( ) through ListRowN). The actual number of list row control objects at this level of the control object hierarchy is dependent upon the number of data sets in the MyOrders data table. The configuration of each list row control object is defined by the itemtemplate declaration starting at line 13 of FIG. 6A. The data binding relationship of each list row control object is defined relative to the data source of each list row control object's binding container (i.e., the table list control object 704). In one embodiment, a control object binding container is the nearest higher level control object in the control object hierarchy that supports the IBindingContainer interface (see A label control object 710 and a label control object 712, corresponding to the declarations on line 14 and 15 of FIG. 6A, are contained by the binding container list row control object 706. The data binding relationships of the label control objects 710 and 712 are defined relative to the binding container list row control object 706, which is data bound to the data sets of the MyOrders data table.

A table list control object 714, corresponding declaration on line 16 of FIG. 6A, is also contained by the binding container list row control object 706. The table list control object 714 is a binding container that is declared as a data bound to the sub-data table MyOrders.MyIngredients. The table list control object 714 contains list row control objects 716–718 (ListRow0 through ListRowN), corresponding to the data sets of the sub-data table MyOrders.MyIngredients. Each list row control object 716–718 is defined by the template declaration starting at line 19 of FIG. 6A. The data binding relationships of the list row control objects 716–718 are defined relative to the binding container table list control object 714.

Each list row control object 716–718 contains to label control objects (e.g., 720 and 722). For example, a label control object 720 is declared on line 20 of FIG. 6A as data bound to the index field of a data set of the sub-data table MyOrders.MyIngredients, and a label control object 722 is declared on line 21 of FIG. 6A as data bound to an Ingredients data item of the subdata table MyOrders.MyIngredients. To determine the data source of the Ingredients data item, properties of the label control object 720 and 722 return a reference to the nearest binding container in a higher level of hierarchy (i.e., a control object that is an IBindingContainer instance, such as the list row control object 716).

The hierarchy under the list row control object 708 follows the same configuration as the hierarchy under the list row control object 706 because it is defined by the same template declarations. The hierarchy includes a first level comprising label control object 730, label control object 734, and table list control object 732. Beneath the table list control object 732, in other level of hierarchy comprises 0 to N list row control objects 736–738. Each list row control object 736–738 contains to label control objects (see label control objects 742, 744, 746, and 748) as defined by the corresponding template declaration.

Figure 8:
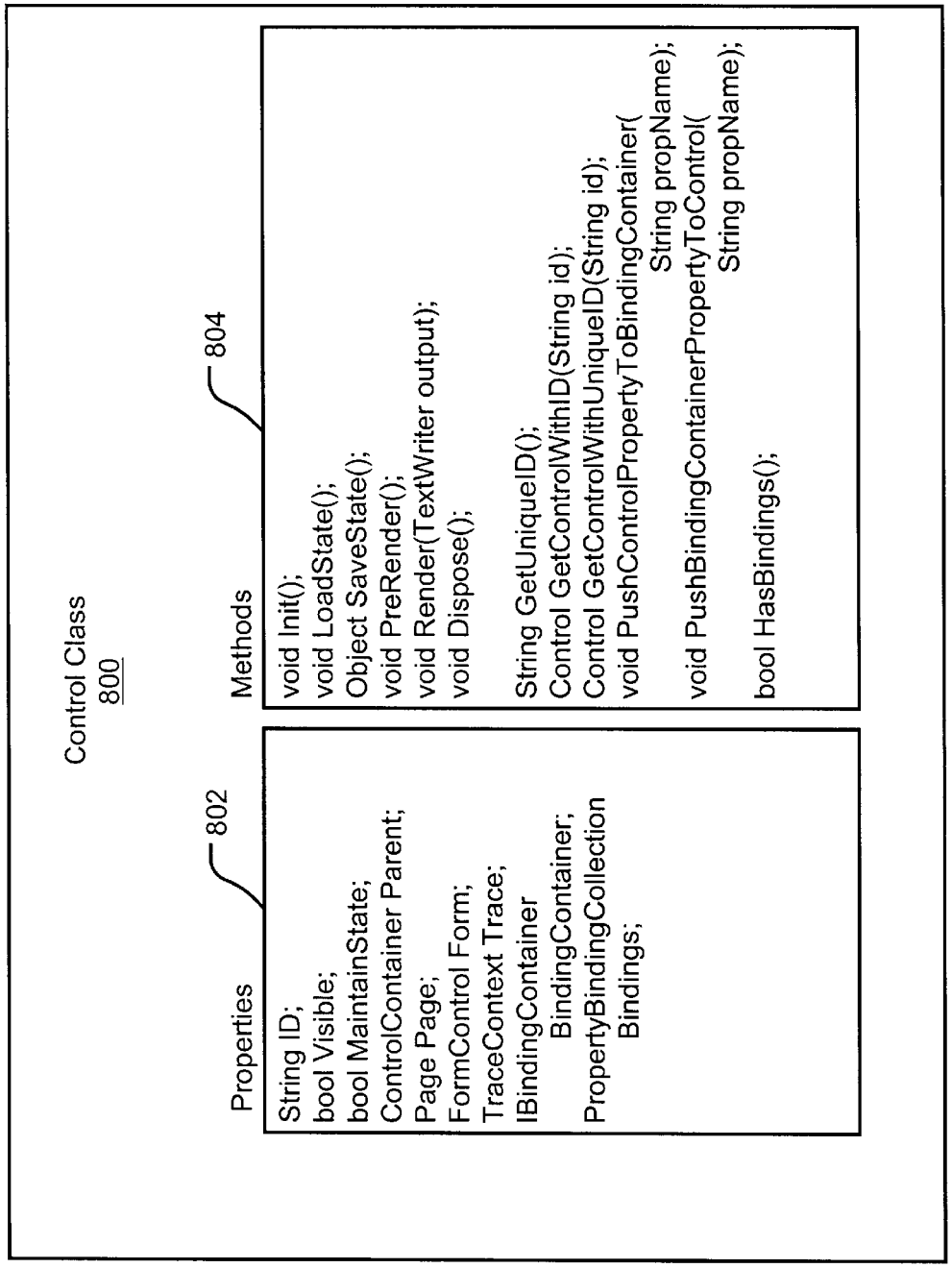
FIG. 8 illustrates a representation of an exemplary server-side Control class in an embodiment of the present invention.

FIG. 8 illustrates a representation of an exemplary server-side Control class in an embodiment of the present invention. The server-side Control class defines the methods, properties and events common to all server-side control objects in an embodiment of the present invention. More specific Control classes (e.g., a server-side button control object that corresponds to a client-side button in a web page) are derived from the control class. A Control class 800 is illustrated as including memory storing properties 802 and methods 804. Other Control class embodiments having a different combination of data members and methods are also contemplated within the scope of the present invention.

In the illustrated embodiment, properties 802 and methods 804 are public. Property "ID" is a readable and writable string value indicating a control object identifier. Property "Visible" is a readable and writable Boolean value that indicates whether the authoring language data for a corresponding client-side user interface element should be rendered. Property "MaintainState" is a readable and writable Boolean value that indicates whether the control object should save its viewstate (and the viewstate of its children) at the end of the current page request (i.e., in response to a save operation 516 in FIG. 5). Property "Parent" is a readable reference to a ControlContainer object associated with the current control object in the control object hierarchy. Property "Page" is a readable reference to the root page object in which the current control object is hosted. Property "Form" is a readable reference to a FormControl object in which the current control object is hosted. Property "Trace" is a readable reference to a TraceContext that allows a developer to write a trace log. PropertyBindingContainer is a readable reference to the control object's immediate data binding container. Property "Bindings" is a readable reference to a collection of the control object's data binding associations.

Methods 804 include methods for processing requests and accessing data members of the control object. In one embodiment, the methods are referenced by pointers stored in the memory space of the Control object. This referencing technique is also employed in embodiments of other server-side objects, including a container control object, a control collection object, and a page object. Method "Init( )" is used to initialize child control objects after they are created (see operation 504 of FIG. 5). Method "Load( )" is used to restore the viewstate information from a previous HTTP request (see operation 506 of FIG. 5). Method "Save( )" is used to save viewstate information for use with a later HTTP request (see operation 516 of FIG. 5). Method "PreRender( )" is used to perform any pre-rendering steps necessary prior to saving viewstate and rendering content (see operation 514 of FIG. 5). Method "Render (TextWriter output)" is used to output authoring language code for the user interface element corresponding to the current control object (see operation 518 of FIG. 5). The code is output to the TextWriter Output Screen passed to it in the "Output" parameter. Method "Dispose( )" is used to perform final clean-up work before terminating the control object (see operation 520 of FIG. 5).

Method "GetUniqueID( )" obtains a unique, hierarchically qualified, string identifier for the current control object. Method "GetControlWithID(String id)" returns a reference to an immediate child control object with the provided identifier ("id"). Method "GetControlWithUniqueID(String id)" returns a reference to a child control object having a unique hierarchical identifier ("id").

Method "PushControlPropertyTwoBindingContainer (String prop Name)", an exemplary push module, is used to update a binding container for two-way data binding from post-back data when the post-back data value changes within the server-side control object. Method "PushBindingContainerPropertyTwoControl(String prop Name)", another exemplary push module, is used to update a server-side control object property with a current binding container value. Method "HasBindings( )" returns of Boolean value indicating whether a control object has any binding associations. These methods are used to resolve binding relationships between properties of server-side control objects and properties in server-side data arrays (see the data binding operation 512 of FIG. 5), which are associated with server-side datastores.

Figure 9:
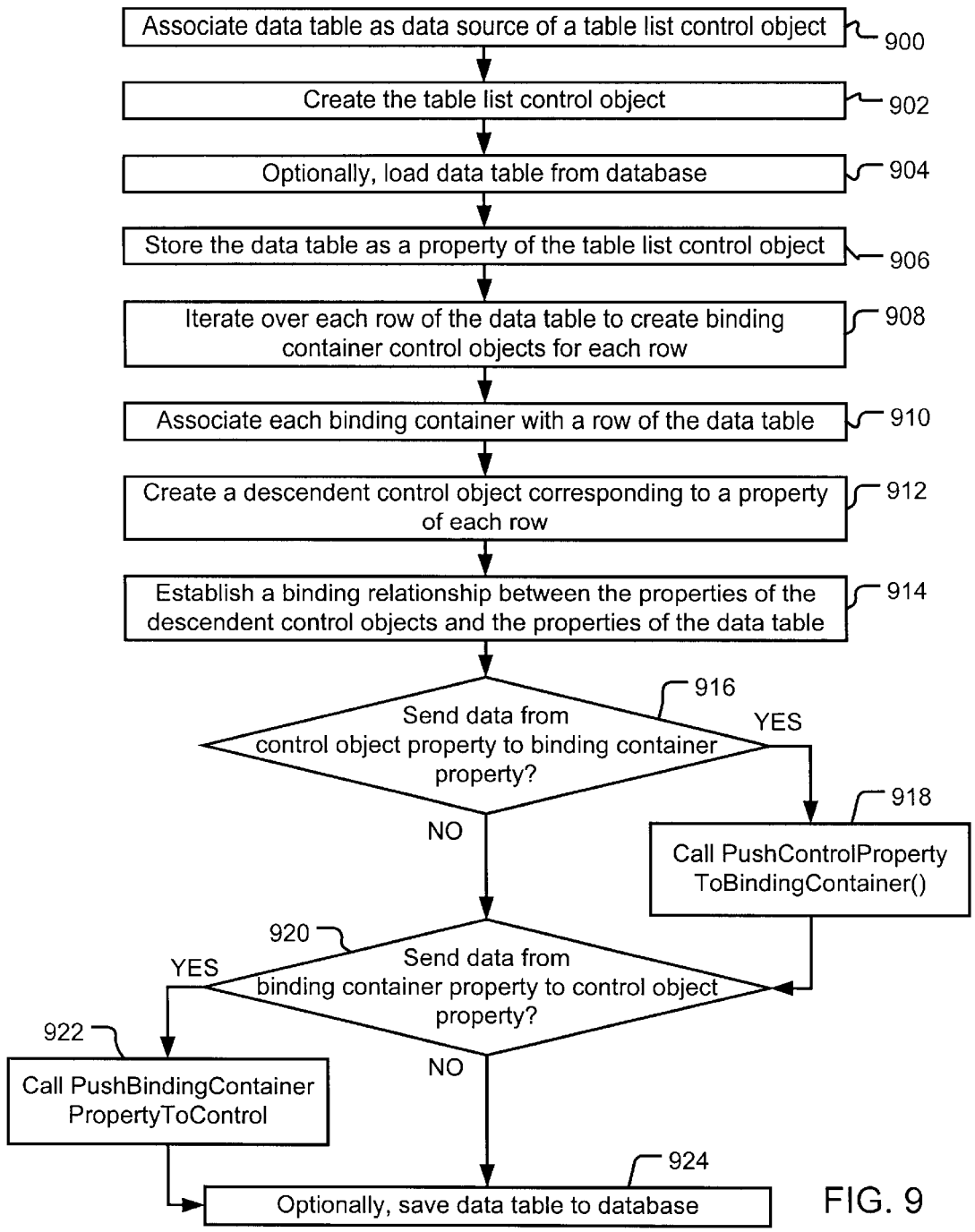
FIG. 9 illustrates a flow diagram of operations for data binding a property of a server-side control object to a property of a server-side data array in an embodiment of the present invention.

FIG. 9 illustrates a flow diagram of operations for data binding a property of a server-side control object to a property of a server-side data array in an embodiment of the present invention. The operations illustrated in FIG. 9 may execute in one or more of the operations illustrated in FIG. 5. For example, in an embodiment of the present invention, operations 900 and 902 execute during a creation operation or the Init operation 504, and the operation 904 executes during the Load operation 506, which results in data table being stored as a property of the table list control object in operation 906. When the table list control object or its children are access during the postback input processing operation 508 and 510 or the databinding operation 512, operations 908, 910, 912, and 914 execute to extend the hierarchy to include the binding containers and their children, in accordance with the configuration of the data table. Operations 916, 918, 920, and 922 execute during the databinding operation 512 of FIG. 5, and operation 924 executes during the Save operation 516 of FIG. 5. The operational correspondence discussed above applies to one embodiment of the present invention; however, other embodiments may reorder or realign the operations of FIGS. 5 and 9.

Turning to the individual operations of FIG. 9, if the page supports unidirectional data binding from a server-side database or bidirectional data binding between the server-side database and the control object hierarchy, operation 900 loads a local data table (i.e., a data array) from a portion of the server-side database using functionality of COM+ reflection. Operation 902 associates the data table as the data source of a table list control object. In one embodiment, this association is accomplished by means of the data binding property specified in declaration of the table list control object (see line 14 of FIG. 6A). Operation 904 creates the table list control object in the control object hierarchy. Operation 906 stores the data table as a property of the table list control object.

In operation 908, the table list control object iterates over each data set of the data table. For each data set detected, the table list control object creates a binding container control object (e.g., a list row control object) based on an associated template declaration. Each binding container control object is treated as a child of the table list control object. Operation 910 associates each binding container control object with a data set of the data table by setting a data binding property of the binding container control object to equal a data set of the data source (e.g., "MyOrders.Row(1)").

In operation 912, each binding container control object creates a descendant control object corresponding to a property of the binding container's corresponding data set of the data source. Alternatively, each binding container control object creates a child control object, which eventually leads to the creation of the descendant control object corresponding to a property of the binding container's corresponding data set of the data source. Operation 914 establishes a binding relationship between the properties of the descendant control objects in the properties of corresponding data sets of the data source. The binding relationships may be defined by a PropertyBinding object stored in a property of the descendant control object.

Decision operation 916 detects whether data from the control object property should be sent to the corresponding binding container property. If so, operation 918 calls the PushControlPropertyToBindingContainer( ) method in the descendant control object to send the data to the binding container. Thereafter, processing proceeds to decision operation 920. Alternatively, if decision operation 916 does not determine that the data from a control object property should be sent to the corresponding binding container property, processing also proceeds from decision operation 916 to decision operation 920, which determines whether data should be sent from a binding container property to the corresponding control object property. If so, operation 932 calls the PushBindingContainerPropertyToControl( ) method in the descendant control object to receive the data from the binding container. Thereafter, supersedes to operation 924. Alternatively, if decision operation 920 determines that the data from the binding container property should not be sent to the control object property, processing also proceeds from decision operation 920 to operation 924. If the page supports unidirectional data binding to a server-side database or bidirectional data binding between the server-side database and the control object hierarchy, operation 924 saves the local data table to a portion of the server-side datastore by way of COM+ reflection. Processing can then continue with the Render operation 518 of FIG. 5.

FIG. 10 illustrates a representation of an exemplary server-side PropertyBindingCollection class in an embodiment of the present invention. The server-side PropertyBindingCollection class defines the methods and properties of a PropertyBindingCollection object (see the Bindings property of the server-side Control class in FIG. 8). A PropertyBindingCollection class 1000 is illustrated as including memory storing properties 1000 into and methods 1004. Other PropertyBindingCollection class embodiments having a different combination of data members and methods are also contemplated within the scope of the present invention.

In the illustrated embodiment, properties 1002 and methods 1004 are public. Property "All" is a readable and writable snapshot array of PropertyBinding objects representing all property bindings in the collection, ordered by an index. Property "this[int index]" is a readable PropertyBinding object that returns a reference to an ordinal-indexed PropertyBinding object within the collection. Property "Count" is a readable integer value indicating the number of PropertyBinding objects within the collection.

Methods 1004 include methods for accessing the data of the PropertyBindingCollection object. Method "Add (PropertyBinding value)" is used to add specified PropertyBinding objects to the collection. Method "IndexOf (PropertyBinding value)" is used to obtain an ordinal index of a PropertyBinding object in the collection. Method "GetEnumerator(bool AllowRemove)" is used to obtain an enumerator of all PropertyBindings within the collection. Method "Remove(PropertyBinding value)" is used to remove a specified PropertyBinding object from the collection. Method "Remove(int index)" is used to remove an index-specified PropertyBinding object from the collection. Method "Clear( )" is used to remove all PropertyBinding objects from the collection.

FIG. 11 illustrates a representation of an exemplary server-side PropertyBinding class in an embodiment of the present invention. The server-side PropertyBinding class defines the methods and properties of a PropertyBinding object (see the "All" and "this[int index]" properties of the PropertyBindingCollection class of FIG. 11), which defines the data binding relationship between a control object and a server-side data source. A PropertyBinding class 1100 is illustrated as including memory storing properties 1102. Other class embodiments having a different combination of data members and methods are also contemplated within the scope of the present invention.

In the illustrated embodiment, properties 1102 are public. Property "BindingContainer" is a readable and writable BindingContainer interface (i.e., an IBindingContainer object) used to identify and gain access to a binding container data source. The IBindingContainer interface is a marker interface that identifies a control that exposes its public properties to the bindings of its descendents. Therefore, the "BindingContainer" property provides a BindingContainer identifier that allows a bound control object to locate and access the server-side data source to which is bound. Property "Property" is a readable and writable string value (i.e., a property identifier) identifying the bound property within the BindingContainer object. Property "Control" is a readable and writable Control object (i.e., identifying the target control object to which a data source property is bound. Property "ControlProperty" is a readable and writable string value (i.e., a property identifier) identifying the target property of the target control object. Property "FormatString" is a readable and writable string value identifying an optional format convergence string.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the processes, systems, computer program products of the invention. Since many embodiments of the invention can be made without departing from the spirit and scope of the invention, the invention resides in the claims hereinafter appended.

We claim:

1. In a server computer coupled to a client computer system, a method of data binding a property of a descendent server-side control object to a property of a data set in a server-side data table having one or more data sets, wherein the descendent server-side control object corresponds to a client-side user interface element, the method comprising:
   iterating over each data set of the server-side data table to create a binding container server-side control object corresponding to each data set;
   associating each binding container server-side control object with one of the data sets of the server-side data table;
   creating a descendent server-side control object for a property of each data set, a given descendent server-side control object being a descendent of the binding container server-side control object corresponding to a given data set and being associated with a property of the given data set; and
   establishing a data binding relationship between the property of the descendent server-side control object and the property of one of the data sets of the server-side data table.

2. The method of claim 1 further comprising:
   loading the server-side data table from a server-side database;
   associating an iterating server-side control object with the server-side data table;
   creating the iterating server-side control object in a server-side control object hierarchy, wherein each binding container server-side control object is a child of the iterating server-side control object; and
   storing the server-side data table as a property of the iterating server-side control object.

3. The method of claim 2 wherein the operation of associating an iterating server-side control object comprises:
   setting a data source property of the iterating server-side control object to reference the server-side data table.

4. The method of claim 2 wherein the iterating operation comprises:
   creating each binding container server-side control element as a child of the iterating server-side control object, each binding container server-side control object being associated with a given data set of the server-side data table.

5. The method of claim 1 wherein the establishing operation comprises:
   creating a binding object including a control identifier of the descendent server-side control object, a first property identifier of the property of the descendent server-side control object, a binding container identifier of the binding container server-side control object, a second property identifier of the property of the data set of the server-side data table.

6. The method of claim 1 further comprising:
   transmitting data stored as the property of the descendent control object for storage as the property of the data set of the server-side data table, based on the data binding relationship.

7. The method of claim 1 further comprising:
   receiving data stored as the property of the of the server-side data table for storage in the property of the descendent control object, based on the data binding relationship.

8. In a server computer coupled to a client computer system, a computer data signal embodied in a carrier wave by a computing system and encoding a computer program for executing a computer process data binding a property of a descendent server-side control object to a property of a data set in a server-side data table having one or more data sets, wherein the descendent server-side control object corresponds to a client-side user interface element, the computer process comprising:
   iterating over each data set of the server-side data table to create a binding container server-side control object corresponding to each data set;
   associating each binding container server-side control object with one of the data sets of the server-side data table;
   creating a descendent server-side control object for a property of each data set, a given descendent server-side control object being a descendent of the binding container server-side control object corresponding to a given data set and being associated with a property of the given data set; and
   establishing a data binding relationship between the property of the descendent server-side control object and the property of one of the data sets of the server-side data table.

9. In a server computer coupled to a client computer system, a computer program storage medium readable by a computer system and encoding a computer program for executing a computer process data binding a property of a descendent server-side control object to a property of a data set in a server-side data table having one or more data sets, wherein the descendent server-side control object corresponds to a client-side user interface element, the computer process comprising:

iterating over each data set of the server-side data table to create a binding container server-side control object corresponding to each data set;

associating each binding container server-side control object with one of the data sets of the server-side data table;

creating a descendent server-side control object for a property of each data set, a given descendent server-side control object being a descendent of the binding container server-side control object corresponding to a given data set and being associated with a property of the given data set; and establishing a data binding relationship between the property of the descendent server-side control object and the property of one of the data sets of the server-side data table.

10. A computer program product encoding a computer program for executing on a computer system a computer process for data binding a property of a descendent server-side control object to a property of a server-side data array having one or more data objects, wherein the child server-side control object corresponds to a client-side user interface element, the computer process comprising:

loading the server-side data array from a server-side database;

associating an iterating server-side control object with the server-side data table;

creating the iterating server-side control object in a server-side control object hierarchy;

storing the server-side data array as a property of the iterating server-side control object;

create a binding container server-side control object corresponding to one of the data objects, wherein the binding container server-side control object is a child of the iterating server-side control object:

associating the binding container server-side control object with the one of the data objects of the server-side data array;

creating a descendent server-side control object for each property of each data object each descendent server-side control object being a descendent of the binding container server-side control object; and establishing a data binding relationship between the property of the descendent server-side control object and the property of the server-side data array.

11. The computer program product of claim 10 wherein the operation of associating an iterating server-side control object comprises:

setting a data source property of the iterating server-side control object to reference the server-side data array.

12. The computer program product of claim 11 wherein the iterating operation of associating the iterating server-side control object comprises:

creating each binding container server-side control element as a child of the iterating server-side control object, each binding container server-side control object being associated with a given data object of the server-side data array.

13. The computer program product of claim 10 wherein the establishing operation comprises:

creating a binding relationship object including a control identifier of the descendent server-side control object, a property identifier of the property of the descendent server-side control object, a binding container identifier of the binding container server-side control object, an property identifier of the property of the data object of the server-side data array.

14. The computer program product of claim 10 further comprising:

sending data stored as the property of the descendent control object for storage as the property of the data object of the server-side data array, based on the data binding relationship.

15. The computer program product of claim 10 further comprising:

receiving data stored as the property of the data object of the server-side data array for storage in the property of the descendent control object, based on the data binding relationship.

16. A server for performing server-side data binding using a hierarchy of server-side control objects corresponding to client-side user interface elements, the server comprising:

a server-side data array having one or more data objects, each data object including a property;

an iterating server-side control object in a server-side control object hierarchy and being associated with the server-side data array;

one or more binding container server-side control objects iteratively created by the iterating server-side control object based on a number of data objects in the server-side data array;

one or more descendent server-side control objects corresponding to a property of each data object of the server-side data array, each descendent server-side control being created as a child of the binding control server-side control object of a given data object in the server-side data array; and a data binding relationship structure describing a data binding relationship between a property of the descendent control object and the property of the data object of the server-side data array.

17. The server of claim 16 further comprising:

a push module storing data from the property of the descendent control object to the property of the data object of the server side data array, based on the data binding relationship.

18. The server of claim 16 further comprising:

a push module storing data from the property of the data object of the server side data array to the property of the descendent control object, based on the data binding relationship.

19. The server of claim 16 further comprising:

a portion of a server-side datastore loaded into the server-side data array.

20. The server of claim 16 further comprising:

a portion of a server-side datastore into which the server-side data array is saved.

* * * * *